(12) United States Patent
Baum

(10) Patent No.: US 8,793,764 B2
(45) Date of Patent: *Jul. 29, 2014

(54) SECURITY EXTENSIONS USING AT LEAST A PORTION OF LAYER 2 INFORMATION OR BITS IN THE PLACE OF LAYER 2 INFORMATION

(75) Inventor: Robert T. Baum, Gaithersburg, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,890

(22) Filed: Dec. 21, 2011

(65) Prior Publication Data

US 2012/0185917 A1    Jul. 19, 2012

Related U.S. Application Data

(63) Continuation of application No. 09/910,429, filed on Jul. 20, 2001, now Pat. No. 8,087,064, which is a continuation-in-part of application No. 09/652,822, filed on Aug. 31, 2000, now Pat. No. 6,771,673, and a continuation-in-part of application No. 09/652,750, filed on Aug. 31, 2000, now Pat. No. 6,850,495, and a continuation-in-part of application No. 09/652,095, filed on Aug. 31, 2000, now Pat. No. 6,993,026, and a continuation-in-part of application No. 09/834,573, filed on Apr. 12, 2001, now Pat. No. 7,315,554.

(51) Int. Cl.
| | |
|---|---|
| H04L 29/06 | (2006.01) |
| H04L 29/08 | (2006.01) |
| G06Q 20/38 | (2012.01) |

(52) U.S. Cl.
CPC .......... *H04L 63/162* (2013.01); *H04L 63/107* (2013.01); *H04L 29/08027* (2013.01); *G06Q 20/382* (2013.01)

USPC ............... 726/3; 713/151; 713/168; 709/225; 705/73

(58) Field of Classification Search
CPC ................ H04L 63/107; H04L 63/162; H04L 29/08027; G06Q 20/382
USPC .......... 726/3; 713/151, 168; 709/225; 705/73
See application file for complete search history.

(56) References Cited

U.S. PATENT DOCUMENTS

| 4,663,748 A | 5/1987 | Karbowiak et al. |
| 5,088,090 A | 2/1992 | Yacoby |

(Continued)

OTHER PUBLICATIONS

Fox, et al., Virtual Private Networks Identifier, RFC 2685, Network Working Group, The Internet Society, 13 pages, Sep. 1999.

(Continued)

*Primary Examiner* — Michael Pyzocha

(57) ABSTRACT

Information applied to a packet at an ingress port of a network may be used for enhancing security. The information applied to a packet may be "context information" which replaces at least some bits of layer 2 information (e.g., a header). Users or customers may define security policies. They may define different security policies for different types of transactions. They may also define security policies based on the location from which the transaction originated. If the customer is an organization with different classes of users, it may define different security policies. The class of user may be identified based on at least a part of the "context information". At least a part of the context information may also be used to monitor a location from which a transaction originated, thereby permitting fraudulent uses to be traced.

25 Claims, 24 Drawing Sheets

(56) References Cited

U.S. PATENT DOCUMENTS

| | | |
|---|---|---|
| 5,351,295 A * | 9/1994 | Perlman et al. ............... 713/162 |
| 5,511,168 A | 4/1996 | Perlman et al. |
| 5,550,816 A | 8/1996 | Hardwick et al. |
| 5,566,170 A | 10/1996 | Bakke et al. |
| 5,600,644 A | 2/1997 | Chang et al. |
| 5,610,905 A | 3/1997 | Murthy et al. |
| 5,638,448 A | 6/1997 | Nguyen |
| 5,644,713 A | 7/1997 | Makishima |
| 5,684,800 A | 11/1997 | Dobbins et al. |
| 5,719,858 A | 2/1998 | Moore |
| 5,740,375 A | 4/1998 | Dunne et al. |
| 5,758,285 A | 5/1998 | Chavez et al. |
| 5,774,640 A | 6/1998 | Kurio |
| 5,805,801 A | 9/1998 | Holloway et al. |
| 5,838,683 A | 11/1998 | Corley et al. |
| 5,867,494 A | 2/1999 | Krishnaswamy et al. |
| 5,880,446 A | 3/1999 | Mori et al. |
| 5,917,820 A * | 6/1999 | Rekhter ........................ 370/392 |
| 5,920,566 A * | 7/1999 | Hendel et al. ................. 370/401 |
| 5,946,313 A | 8/1999 | Allan et al. |
| 5,954,829 A | 9/1999 | McLain et al. |
| 5,959,989 A | 9/1999 | Gleeson et al. |
| 5,963,543 A | 10/1999 | Rostoker et al. |
| 5,988,497 A | 11/1999 | Wallace |
| 5,991,300 A | 11/1999 | Tappan |
| 5,999,525 A | 12/1999 | Krishnaswamy et al. |
| 6,014,380 A | 1/2000 | Hendel et al. |
| 6,035,405 A | 3/2000 | Gage et al. |
| 6,049,528 A | 4/2000 | Hendel et al. |
| 6,058,429 A | 5/2000 | Ames et al. |
| 6,094,435 A | 7/2000 | Hoffman et al. |
| 6,097,720 A | 8/2000 | Araujo et al. |
| 6,104,700 A | 8/2000 | Haddock et al. |
| 6,147,995 A | 11/2000 | Dobbins et al. |
| 6,154,839 A | 11/2000 | Arrow et al. |
| 6,167,513 A * | 12/2000 | Inoue et al. ................... 713/150 |
| 6,181,695 B1 | 1/2001 | Curry et al. |
| 6,195,425 B1 | 2/2001 | Farris |
| 6,230,194 B1 | 5/2001 | Frailong et al. |
| 6,243,379 B1 | 6/2001 | Veerina et al. |
| 6,256,314 B1 | 7/2001 | Rodrig et al. |
| 6,262,976 B1 | 7/2001 | McNamara |
| 6,275,859 B1 | 8/2001 | Wesley et al. |
| 6,304,901 B1 | 10/2001 | McCloghrie et al. |
| 6,314,106 B1 | 11/2001 | King et al. |
| 6,317,729 B1 | 11/2001 | Camp et al. |
| 6,330,250 B1 | 12/2001 | Curry et al. |
| 6,335,927 B1 | 1/2002 | Elliott et al. |
| 6,367,018 B1 * | 4/2002 | Jain ..................................... 726/2 |
| 6,374,282 B1 * | 4/2002 | Bunton et al. ................. 718/101 |
| 6,377,987 B1 | 4/2002 | Kracht |
| 6,421,343 B1 | 7/2002 | Jun et al. |
| 6,430,621 B1 | 8/2002 | Srikanth et al. |
| 6,442,162 B1 | 8/2002 | O'Neill et al. |
| 6,449,279 B1 | 9/2002 | Belser et al. |
| 6,456,597 B1 | 9/2002 | Bare |
| 6,473,403 B1 | 10/2002 | Bare |
| 6,477,648 B1 | 11/2002 | Schell et al. |
| 6,493,318 B1 | 12/2002 | Bare |
| 6,502,192 B1 * | 12/2002 | Nguyen ............................. 726/4 |
| 6,539,011 B1 | 3/2003 | Keenan et al. |
| 6,546,001 B1 | 4/2003 | Semper et al. |
| 6,553,029 B1 | 4/2003 | Alexander |
| 6,556,541 B1 | 4/2003 | Bare |
| 6,556,574 B1 | 4/2003 | Pearce et al. |
| 6,574,240 B1 | 6/2003 | Tzeng |
| 6,577,600 B1 | 6/2003 | Bare |
| 6,577,653 B1 | 6/2003 | Rochberger et al. |
| 6,580,715 B1 | 6/2003 | Bare |
| 6,618,381 B1 | 9/2003 | Miyamoto et al. |
| 6,625,124 B1 | 9/2003 | Fan et al. |
| 6,633,571 B1 | 10/2003 | Sakamoto et al. |
| 6,636,516 B1 | 10/2003 | Yamano |
| 6,640,251 B1 * | 10/2003 | Wiget et al. ................... 709/238 |
| 6,643,267 B1 | 11/2003 | Karia et al. |
| 6,643,287 B1 | 11/2003 | Callon et al. |
| 6,674,756 B1 | 1/2004 | Rao et al. |
| 6,674,769 B1 | 1/2004 | Viswanath |
| 6,684,253 B1 * | 1/2004 | Whitaker et al. ............. 709/229 |
| 6,701,361 B1 | 3/2004 | Meier |
| 6,731,625 B1 | 5/2004 | Eastep et al. |
| 6,751,220 B1 | 6/2004 | Li |
| 6,754,181 B1 | 6/2004 | Elliott et al. |
| 6,754,211 B1 * | 6/2004 | Brown .......................... 370/389 |
| 6,757,281 B1 | 6/2004 | Irish |
| 6,765,866 B1 | 7/2004 | Wyatt |
| 6,771,673 B1 | 8/2004 | Baum et al. |
| 6,826,195 B1 | 11/2004 | Nikolich et al. |
| 6,850,495 B1 | 2/2005 | Baum et al. |
| 6,850,531 B1 | 2/2005 | Rao et al. |
| 6,873,618 B1 | 3/2005 | Weaver |
| 6,940,814 B1 * | 9/2005 | Hoffman ....................... 370/235 |
| 6,993,026 B1 | 1/2006 | Baum et al. |
| 7,010,604 B1 * | 3/2006 | Munger et al. ................ 709/227 |
| 7,055,173 B1 * | 5/2006 | Chaganty et al. .............. 726/11 |
| 7,222,188 B1 | 5/2007 | Ames et al. |
| 7,310,688 B1 | 12/2007 | Chin |
| 7,336,790 B1 * | 2/2008 | Caronni et al. ................ 380/277 |
| 7,469,297 B1 | 12/2008 | Kostoff et al. |
| 7,839,802 B2 | 11/2010 | Baum et al. |
| 2002/0024950 A1 | 2/2002 | Fink et al. |
| 2002/0027906 A1 | 3/2002 | Athreya et al. |
| 2002/0101989 A1 * | 8/2002 | Markandey et al. .......... 380/210 |
| 2003/0067912 A1 | 4/2003 | Mead et al. |
| 2003/0165140 A1 | 9/2003 | Tang et al. |
| 2004/0030804 A1 | 2/2004 | Wiget et al. |
| 2005/0180429 A1 | 8/2005 | Ghahremani et al. |
| 2006/0253599 A1 | 11/2006 | Monteiro et al. |
| 2009/0225675 A1 | 9/2009 | Baum et al. |

OTHER PUBLICATIONS

Meng, "Data Link Layer," http://ww.cs.panam.edu/~meng/Course/CS6345/Notes/chpt-4/node2.html, two pages, Oct. 14, 1997.

O'Hanlon, "Notes From the 47th IETF Meeting," University College London, Internet Engineering Task Force (IETF), 13 pages, http://piersohanlon.com/papers/ietf47.html, Mar. 26-31, 2000.

Valencia, et al., "Cisco Layer Two Forwarding (Protocol) 'L2F', RFC 2341," Network Working Group, http://tools.ietf.org/html/rfc2341, pp. 1-29, May 1998.

\* cited by examiner

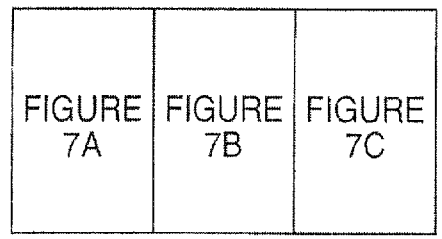
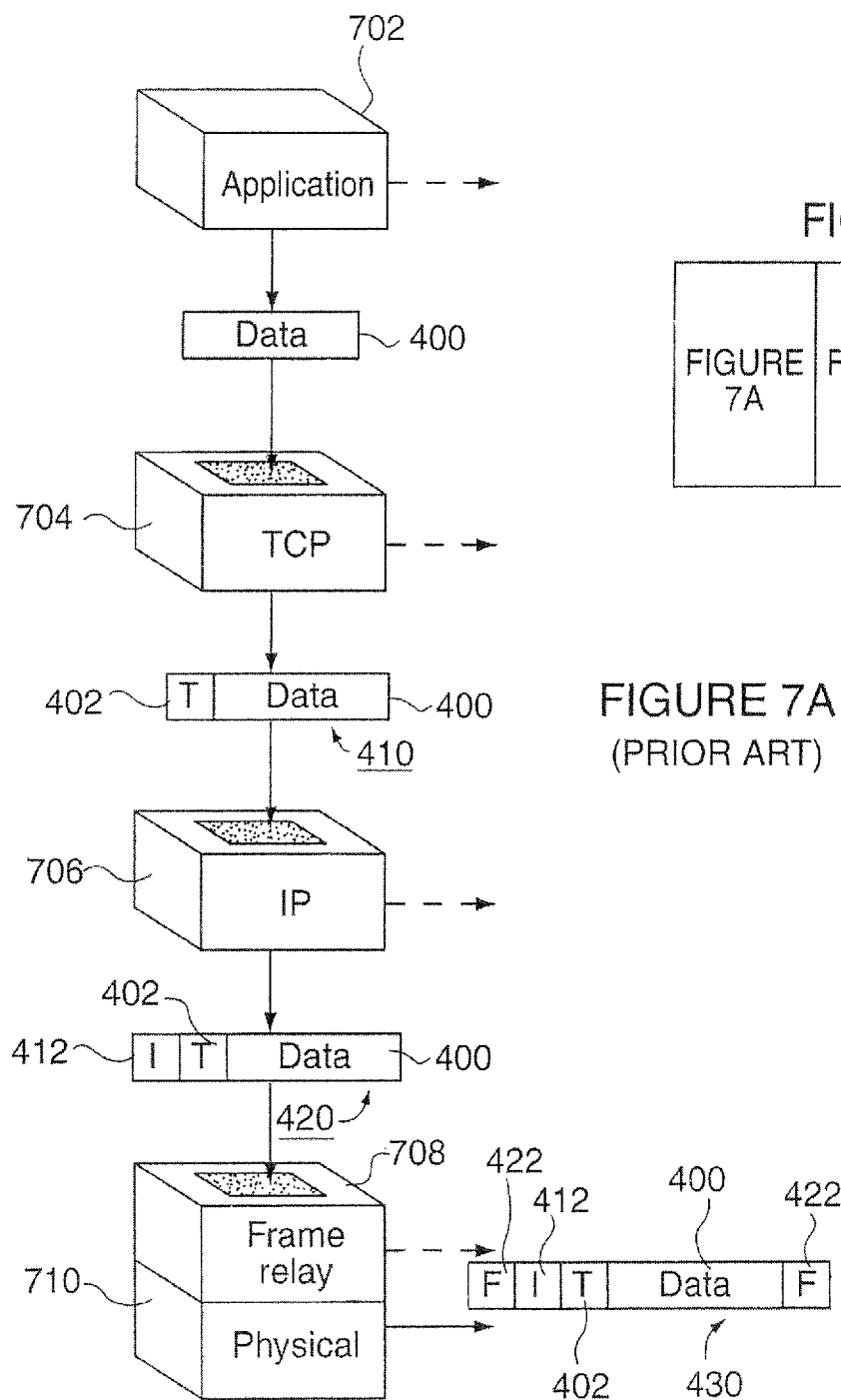
FIGURE 7A
(PRIOR ART)

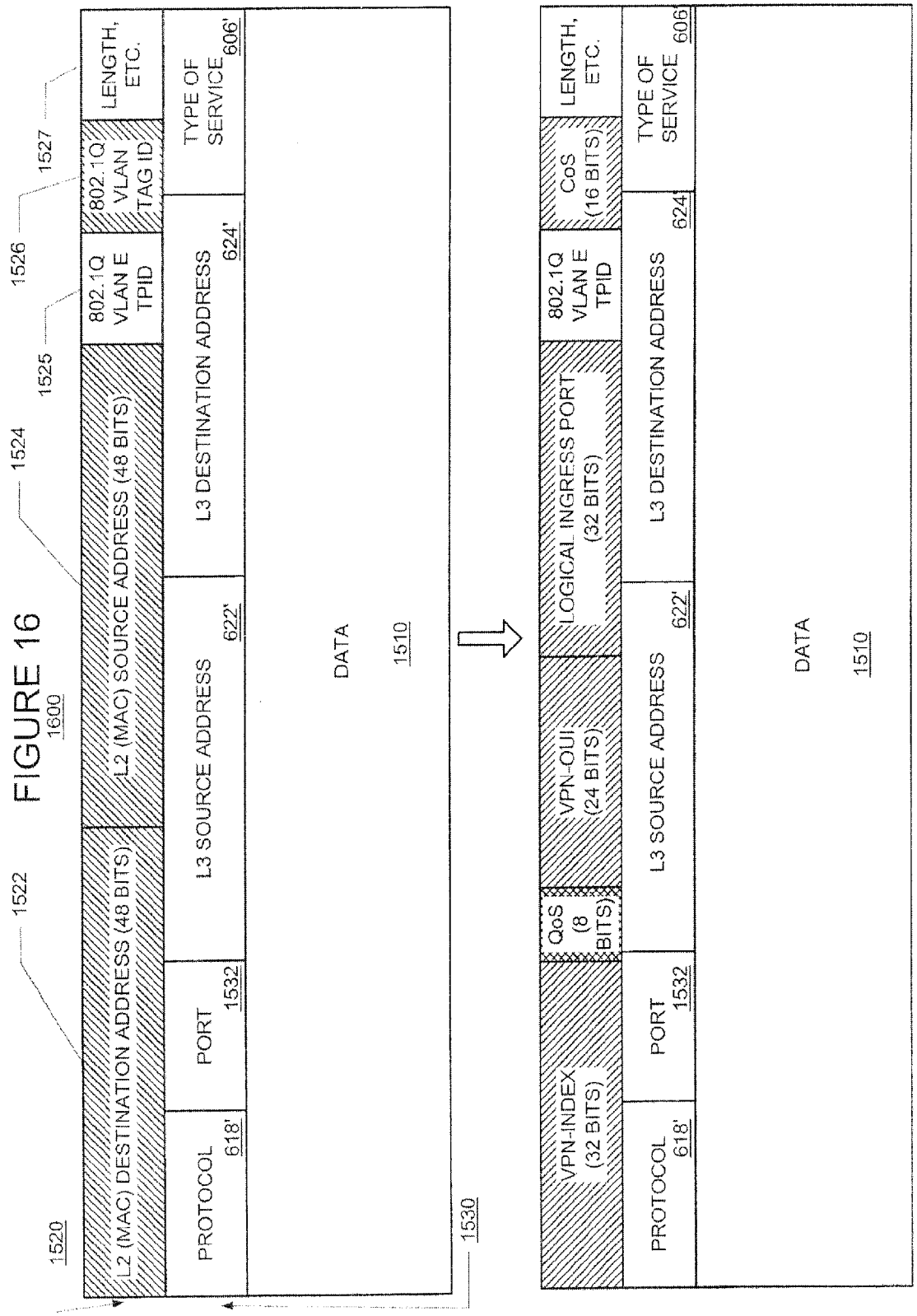

FIGURE 17
1700

| Field | Bits |
|---|---|
| L2 (MAC) DESTINATION ADDRESS (48 BITS) | |
| L2 (MAC) SOURCE ADDRESS (48 BITS) | |
| | ETHER TYPE — 1716 |
| L3 SOURCE ADDRESS (INGRESS ACCESS ROUTER - TABLE) 1740 | L3 DESTINATION ADDRESS (EGRESS ACCESS ROUTER - TABLE) 1710 | TYPE OF SERVICE (IN NETWORK) 1750 — 1760 |
| VPN-INDEX (32 BITS) | QoS (8 BITS) | VPN-OUI (24 BITS) | LOGICAL INGRESS PORT (32 BITS) | 802.1Q VLAN E TPID 1720 | CoS (16 BITS) | LENGTH, ETC. |
| PROTOCOL 618' | PORT 1532 | L3 SOURCE ADDRESS 622' | L3 DESTINATION ADDRESS 624' | TYPE OF SERVICE 606' |
| DATA 1510 | | | | |

SECURITY EXTENSIONS USING AT LEAST A PORTION OF LAYER 2 INFORMATION OR BITS IN THE PLACE OF LAYER 2 INFORMATION

§0. RELATED APPLICATIONS

This application is a continuation of U.S. patent application Ser. No. 09/910,429, entitled "SECURITY EXTENSIONS USING AT LEAST A PORTION OF LAYER 2 INFORMATION OR BITS IN THE PLACE OF LAYER 2 INFORMATION", by Robert T. Baum filed on Jul. 20, 2001, which is a continuation-in-part of each of the following applications: (i) U.S. patent application Ser. No. 09/652,822, entitled "METHODS, APPARATUS AND DATA STRUCTURES FOR PROVIDING ACCESS TO AN EDGE ROUTER OF A NETWORK", by Robert T. Baum and Eric A. Voit filed on Aug. 31, 2000; (ii) U.S. patent application Ser. No. 09/652,750, entitled "METHODS, APPARATUS AND DATA STRUCTURES FOR SEGMENTING CUSTOMERS USING AT LEAST A PORTION OF A LAYER 2 ADDRESS HEADER OR BITS IN THE PLACE OF A LAYER 2 ADDRESS HEADER", by Robert T. Baum and Eric A. Voit filed on Aug. 31, 2000; (iii) U.S. patent application Ser. No. 09/652,095, entitled "METHODS, APPARATUS AND DATA STRUCTURES FOR PRESERVING ADDRESS AND SERVICE LEVEL INFORMATION IN A VIRTUAL PRIVATE NETWORK", by Robert T. Baum and Eric A. Voit filed on Aug. 31, 2000; and (iv) U.S. patent application Ser. No. 09/834,573, entitled "SIMPLE PEERING IN A TRANSPORT NETWORK EMPLOYING NOVEL EDGE DEVICES", by Robert T. Baum and Eric A. Voit filed on Apr. 13, 2001. Priority to these applications is claimed under 35 U.S.C. §120, and each of these applications is incorporated herein by reference.

§1.1 FIELD OF THE INVENTION

The present invention concerns methods, apparatus and data structures for enhancing security for online transactions.

§1.2 RELATED ART

Although networking software and network reference models are known to those skilled in the art, they are introduced in §§1.2.1 and 1.2.2 below for the reader's convenience. Then, online transactions and security issues related to such transactions are discussed in §1.2.3.

§1.2.1 Communications Protocol Stack

To reduce their complexity, networks may be organized as a series of layers, each one built upon the one below it as shown in FIG. 1. Each layer functions to offer certain services to the higher layer, thereby shielding those higher layers from the details of how the offered services are actually implemented. The entities comprising the corresponding layers on different machines are called "peers". Such peers use rules and conventions, also referred to as the layer n protocol, to communicate with each other as depicted by the dashed lines in FIG. 1. Actually, no data are directly transferred from layer n on one machine to layer n on another machine. Rather, in the machine transmitting the data, each layer passes data and control information to the layer immediately below it, until the lowest layer (layer 1) is reached. Below layer 1, is a physical medium 110 through which actual communications take place. At the machine receiving the data, each layer passes data and control information to the layer immediately above it until the highest layer is reached. Thus, referring to FIG. 1, actual communications take place via the solid lines and the physical medium 110, while virtual peer-to-peer communications occur via the dashed lines.

Still referring to FIG. 1, interfaces are arranged between adjacent layers. Each of these interfaces defines primitive operations and services that the lower layer offers to the upper layer.

The set of layers and protocols may be referred to as a "network architecture". A list of protocols used by a system, one protocol per layer, may be referred to as a "protocol stack" or "protocol suite".

§1.2.2 Network Architecture Reference Models

FIG. 2 illustrates a comparison of the Open Systems Interconnection (or "OSI") reference model 210 for network architectures and the transfer control protocol/Internet protocol (or "TCP/IP") reference model 220 for network architectures. Although those skilled in the art will be familiar with both reference models, each is introduced below for the reader's convenience.

§1.2.2.1 The OSI Reference Model

As shown in FIG. 2, the OSI reference model 210 has seven (7) distinct layers; namely, (i) a physical layer 211, (ii) a data link layer 212, (iii) a network layer 213, (iv) a transport layer 214, (v) a session layer 215, (vi) a presentation layer 216, and (vii) an application layer 217. Each layer is briefly introduced below.

The physical layer 211 deals with transmitting raw bits over a communications channel. Thus, the physical layer is typically concerned with mechanical, electrical, optical, and procedural interfaces, as well as the physical transmission medium (e.g., twisted copper pair, co-axial cable, optical fiber, etc.) that lies below the physical layer.

The data link layer 212 functions to transform a raw communications facility into a line that appears free from undetected transmission errors to the network layer 213. The data link layer 212 does this by having the sending host segment its data into "data frames", transmitting these frames to the receiving host, and processing "acknowledgement frames" sent back from the receiver.

The network layer 213 functions to control the operation of a subnetwork between the hosts and controls the routing of packets between the hosts.

The transport layer 214 functions to accept data from the session layer 215 and segment this data into smaller units, if necessary, for use by the network layer 213. The transport layer 214 also determines a type of service (e.g., error-free, point-to-point) to provide to the session layer 215. Further, the transport layer 214 controls the flow of data between hosts. The transport layer 214 is a true "end-to-end" layer, from source host to destination host, since a program on the source machine converses with a similar program on the destination machine, using message headers and control messages.

The session layer 215 functions to allow different machines to establish sessions between them. The session layer 215 may manage dialog control and maintain synchronization.

The presentation layer 215 concerns the syntax and semantics of information transmitted.

The application layer 216 may function to define network virtual terminals that editors and other programs can use, and to transfer files.

§1.2.2.2 The Tcp/Ip Model

Although the TCP/IP protocol suite, which is the foundation of the Internet, is known to those skilled in the art, it is briefly described below for the reader's convenience. As shown in FIG. 2, the TCP/IP reference model 220 includes a physical layer 221, a network access layer 222, an internet layer 223, a transport layer 224, and an application layer 225. Each of these layers is briefly introduced below.

The physical layer 221 defines the interface between a data transmission device (e.g., a computer) and a transmission medium (e.g., twisted pair copper wires, co-axial cable, optical fiber, etc.). It specifies the characteristics of the transmission medium, the nature of the signals, the data rate, etc.

The network access layer 222 defines the interface between an end system and the network to which it is attached. It concerns access to, and routing data across, a network. Frame relay is an example of a network access layer.

The internet layer 223 functions to permit hosts to inject packets into any network and have them travel independently to the destination machine (which may be on a different network). Since these packets may travel independently, they may event arrive in an order other than the order in which they were sent. Higher layers can be used to reorder the packets. Thus, the main function of the internet layer 320 is to deliver (e.g., route) IP packets to their destination.

The transport layer 224 is an end-to-end protocol. For example, the transmission control protocol (or "TCP") is a reliable connection-oriented protocol that allows a byte stream originating on one machine to be delivered, without error, on any other machine on the Internet. More specifically, the TCP protocol fragments an incoming data stream into discrete messages, each of which is passed to the internet layer 223. At the destination, the TCP protocol reassembles the received messages into an output stream.

The TCP/IP model 220 does not have session and presentation layers. Instead, an application layer 225 contains all of the higher-level protocols that are used to support various types of end use applications (e.g., the simple mail transfer protocol (or "SMTP") for e-mail, the file transfer protocol (or "FTP"), etc.).

The TCP/IP model does not define what occurs below the internet layer 223, other than to note that the host has to connect to the network using some protocol so that it can send IP packets over it. This protocol varies from host to host and network to network.

Basically, each of the layers encapsulates, or converts, data in a higher layer. For example, referring to FIG. 4, user data 400 as a byte stream is provided with a TCP header 402 to form a TCP segment 410. The TCP segment 410 is provided with an IP header 412 to form an IP datagram 420. The IP datagram 420 is provided with a network header 422 to define a network-level packet 430. The network-level packet 430 is then converted to radio, electrical, optical (or other) signals sent over the transmission medium at a specified rate with a specified type of modulation.

The TCP header 402, as illustrated in FIG. 5, includes at least twenty (20) octets (i.e., 160 bits). Fields 502 and 504 identify ports at the source and destination systems, respectively, that are using the connection. Values in the sequence number 506, acknowledgement number 508 and window 516 files are used to provide flow and error control. The value in the checksum field 518 is used to detect errors in the TCP segment 410.

FIGS. 6A and 6B illustrate two (2) alternative IP headers 412 and 412', respectively. Basically, FIG. 6A depicts the IP protocol (Version 4) that has been used. FIG. 6B depicts a next generation IP protocol (Version 6) that, among other things, provides for more source and destination addresses.

More specifically, referring to FIG. 6A, the four (4) bit version field 602 indicates the version number of the IP, in this case, version 4. The 4-bit Internet header length field 604 identifies the length of the header 412 in 32-bit words. The 8-bit type of service field 606 indicates the service level that the IP datagram 420 should be given. The 16-bit total length field 608 identifies the total length of the IP datagram 420 in octets. The 16-bit identification field 610 is used to help reassemble fragmented user data carried in multiple packets. The 3-bit flags field 612 is used to control fragmentation.

The 13-bit fragment offset field 614 is used to reassemble a datagram 420 that has become fragmented. The 8-bit time to live field 616 defines a maximum time that the datagram is allowed to exist within the network it travels over. The 8-bit protocol field 618 defines the higher-level protocol to which the data portion of the datagram 420 belongs. The 16-bit header checksum field 620 permits the integrity of the IP header 412 to be checked. The 32-bit source address field 322 contains the IP address of the sender of the IP datagram 420 and the 32-bit destination address field contains the IP address of the host to which the IP datagram 120 is being sent. Options and padding 626 may be used to describe special packet processing and/or to ensure that the header 412 is a complete multiple of 32-bit words.

Referring to FIG. 6B, the four (4) bit version field 602 indicates the version number of the IP, in this case, version 6. The 4-bit priority field 628 enables a sender to prioritize packets sent by it. The 24-bit flow label field 630 is used by a source to label packets for which special handling is requested. The 16-bit payload length field 632 identifies the size of data carried in the packet. The 8-bit next header field 634 is used to indicate whether another header is present and if so, to identify it. The 8-bit hop limit field 636 serves to discard the IP datagram 420 if a hop limit (e.g., the number of times the packet is routed) is exceeded. Also provided are 128-bit source and destination address fields 322' and 324', respectively.

Having described the TCP/IP protocol stack 220, the routing of a TCP/IP packet is now described.

A TCP/IP packet is communicated over the Internet (or any internet or intranet) via routers. Basically, routers in the Internet use destination address information (Recall fields 624 and 624'.) to forward packets towards their destination. Routers interconnect different networks. More specifically, routers accept incoming packets from various connected networks, use a look-up table to determine a network upon which the packet should be placed, and routes the packet to the determined network.

FIG. 7, which includes FIGS. 7A through 7C, illustrates the communication of data from a sender, to a receiver, using the TCP/IP protocol stack. Referring first to FIG. 7A, an application protocol 702 prepares a block of data (e.g., an e-mail message (SMTP), a file (FTP), user input (TELNET), etc.) 400 for transmission. Before the data 400 are sent, the sending and receiving applications agree on a format and encoding and agree to exchange data (Recall, e.g., the peer-to-peer communications depicted with dashed lines in FIG. 1.). If necessary, the data are converted (character code, compression, encryption, etc.) to a form expected by the destination device.

The TCP layer 704 may segment the data block 400, keeping track of the sequence of segments. Each TCP segment 410 includes a header 402 containing a sequence number (recall field 506) and a frame check sequence to detect errors. A copy of each TCP segment is made so that if a segment is lost or damaged, it can be retransmitted. When an acknowledgement of safe receipt is received from the receiver, the copy of the segment is erased.

The IP layer 706 may break the TCP segment into a number of datagrams 420 to meet size requirements of networks over which the data will be communicated. Each datagram includes the IP header 412.

A network layer 708, such as frame relay for example, may apply a header and trailer 422 to frame the datagram 420. The header may include a connection identifier and the trailer may contain a frame check sequence for example. Each frame 430 is then transmitted, by the physical layer 710, over the transmission medium as a sequence of bits.

FIG. 7B illustrates the operation of the TCP/IP protocol stack at a router in the network. The physical layer 712 receives the incoming signal 430 from the transmission medium and interprets it as a frame of bits. The network (e.g., frame relay) layer 714 then removes the header and trailer 422 and processes them. A frame check sequence may be used for error detection. A connection number may be used to identify the source. The network layer 714 then passes the IP datagram 420 to the IP layer 718.

The IP layer examines the IP header 412 and makes a routing decision (Recall the destination address 324, 324'). A local line control (or "LLC") layer 720 uses a simple network management protocol (or "SNMP") and adds a header 750 that contains a sequence number and address information. Another network layer 722 (e.g., media access control (or "MAC")) adds a header and trailer 760. The header may contain address information and the trailer may contain a frame check sequence. The physical layer 724 then transmits the frame 450 over another transmission medium.

FIG. 7C illustrates the operation of the TCP/IP protocol stack at a receiver. The physical layer 732 receives the signals from the transmission medium and interprets them as a frame of bits. The network layer 734 removes the header and trailer 760 and processes them. For example, the frame check sequence in the trailer may be used for error detection. The resulting packet 440 is passed to the transport layer 736, which processes the header 750 for flow and error control. The resulting IP datagram 420 is passed to the IP layer 738, which removes the header 412. Frame check sequence and other control information may be processed at this point.

The TCP segment 410 is then passed to the TCP layer 740, which removes the header 402 and may check the frame check sequence. (In the event of a match, the match is acknowledged and in the event of a mismatch, the packet is discarded.) The TCP layer 740 then passes the data 400 to the application layer 742. If the user data was segmented (or fragmented), the TCP layer 740 reassembles it. Finally, the application layer 742 performs any necessary transformations, such as decompression and decryption for example, and directs the data to an appropriate area of the receiver, for use by the receiving application.

§1.2.3 Online Transactions and Security

The volume of online transactions, commonly referred to as e-business, has dramatically increased in recent years (i.e., the late 1990s and on). This growth is expected to continue. Online transactions such as online sales have been secured by credit cards, or more generally, credit information.

In a normal (offline) transaction, a purchaser merely needs to present the credit card to a vendor—all information necessary to complete the financial transaction is contained on the credit card. This very convenient property of credit cards inherently exposes credit card owners to a certain degree of risk for fraudulent use, since the credit card information necessary for the financial transaction appears on the face of the credit card. Thus, if a credit card is lost or stolen, an unauthorized user of the credit card may complete financial transactions by merely presenting the credit card number to a vendor. This danger exists in the realm of online transactions or e-commerce as well.

In order to prevent unauthorized use of a credit card, vendors have conventionally asked for picture identification or compared the purchaser's signature with a signature on the card to help to authenticate that the purchaser owns, or is authorized to use, the card. However, such authorization techniques are more challenging online, and are not feasible for widespread use at this time.

In online transactions or e-commerce involving credit card transactions, the purchaser inputs the credit card information from a remote terminal, such as a computer terminal or telephone keypad, and this information is transmitted (typically in encrypted form) to the vendor. Obviously, the authorization and authentication techniques used for in-person transactions introduced above are less useful, if they are possible at all, with electronic credit card transactions. Accordingly, new security measures are needed to prevent or at least minimize fraudulent and unauthorized electronic credit card transactions. Some known authorization techniques and their perceived drawbacks are introduced in §1.2.3.1 below.

§1.2.3.1 Known Credit Card Authorization and Authentication Techniques and their Perceived Drawbacks One security measure developed for electronic credit card transactions is to verify the billing address of the credit card holder. More specifically, the purchaser is required to input their billing address along with their credit card information through the remote terminal. The financial institution issuing the credit card will typically have the billing address for each of its credit card holders stored along with the associated credit card information in a database of credit card holders' accounts. When the credit card information is presented to the financial institution from the vendor for authentication (and authorization), the stored billing address associated with the credit card number submitted is compared with the billing address input by the purchaser to ensure they match. If the addresses do not correlate, then the purchaser cannot be authenticated and may be deemed to be an unauthorized user. In such an event, the credit card transaction may be denied.

Unfortunately, however, address verification systems of this type are not entirely effective in preventing unauthorized use. More specifically, individuals usually carry their credit cards in their wallets along with other personal identification, such as the individual's driver's license. A thief who steals the individual's wallet will often have access to the individual's personal identification as well as their credit card. Therefore, the thief will know the credit card holder's address and will be able to satisfy the address verification test during the authorization procedure. Thus, address verification systems have not been successful in entirely eliminating fraudulent usage of credit cards.

Another security measure for preventing fraudulent electronic credit card transactions is to use automated number identification (ANI) blocking. Since many electronic credit card transactions are performed from remote terminals connected through telephone lines, the vendor can use caller ID to automatically determine the telephone number associated with the telephone line of the remote device from the telephone carrier. The vendor may then use a stored list of telephone numbers associated with a pattern of fraudulent use, wherein the ANI collected is compared with the stored list to determine if a match exists. If the ANI collected is on the stored list, then that telephone line is blocked from further use.

ANI blocking is effective in preventing continued fraudulent usage of a credit card from a particular phone number.

However, ANI blocking is also of limited usefulness, because it does not prohibit initial fraudulent use(s) and because it can generate "false positives". Each of these limitations of ANI blocking is addressed below. More specifically, since the ANI blocking method relies on a list of telephone numbers associated with a pattern of fraudulent uses, fraudulent uses before the telephone number is added to the list are not prevented. Second, since the ANI blocking method may flag a telephone number used in the past, perhaps just one single time, for a fraudulent credit card transaction as "a blocked phone number", further valid transactions originating from that telephone number will be denied (since the telephone number has been blocked by ANI blocking). This susceptibility for "false positives" is especially problematical in the context of remote terminals frequently having a plurality of different users, such as hotel room telephones or pay phones. Thus, while ANI blocking is effective in preventing repeated fraudulent credit card transactions from occurring from the same remote terminal, it also has the detrimental effect of preventing subsequent valid credit card transactions from being performed from the same remote terminal. Such "false positives" represent lost sales to the vendor.

Moreover, many terminals of potential customers may be "connected" with a vendor terminal via a proxy. For example, potential customers may access a vendor's Internet site via an Internet service provider (or "ISP") which shields information regarding a telephone from which a customer called. This arrangement could prohibit the ANI blocking technique from working properly.

Furthermore, even if the customer terminal is not "connected" with the Internet, and hence a vendor's Internet site, via some proxy, it may use an access technology other than a modem using a standard telephone line. In such instances, a terminal will typically be identified by its layer 3 (or Internet protocol) address or the layer 3 address of equipment that terminates its access communications link (e.g., co-axial cable, DSL enabled telephone lines, etc.). Terminals which have "visited" an Internet site before may also be distinguished from other terminals, though not necessarily identified, by so-called "cookies" which may be written, by the Internet site, onto a storage device of the terminal. However, such cookies may be erased or their storage in the first place may be prevented.

Finally, many users and potential users of e-commerce facilities are concerned about transmitting sensitive personal/financial information over networks.

Clearly, there is a need for a method for preventing or minimizing fraudulent online transactions, such as credit card transactions for example, that does not also inadvertently prevent valid online transactions. Moreover, there is a need for a more secure method for preventing fraudulent online transactions by requiring identifying data that a fraudulent user cannot easily access or manipulate. In some instances, it would be desirable to be able to authorize a transaction without needing personal/financial information and/or without needing client software signaling.

§2. SUMMARY OF THE INVENTION

The present invention uses information applied to a packet at an ingress port of a network for enhancing security. More specifically, the present invention may use such information for authentication of, for example, a user, a group, etc. Such authentication may be applied in addition to (i.e., as an extension of) other authentication measures. The information applied to a packet may be "context information" which replaces at least some bits of a layer 2 header, as is the case in the systems described in the patent applications listed in §0 above and summarized in §4.1 below.

Users or customers may define security policies. They may define different security policies for different types of transactions. They may also define security policies based on the location from which the transaction originated. If the customer is an organization with different classes of users, it may define different security policies based on the type of transaction, the location from which the transaction originated, and/or the class of user. The class of user may be identified based on at least a part of the "context information".

The present invention may also use at least a part of the context information to monitor a location from which a transaction originated. In this way, if fraud does occur, it can be traced.

§3. BRIEF DESCRIPTION OF THE DRAWINGS

FIG. 1 illustrates the way in which network communications schemes may be described by a stack of protocols.

FIG. 2 compares the OSI reference model and the TCP/IP protocol suite.

FIGS. 7A through 7C illustrate the transmission of data over a network in accordance with the TCP/IP protocol suite.

FIG. 16 illustrates the modification, by an exemplary aggregation unit, of a packet sent from a customer and bound for a network.

FIG. 17 illustrates the modification, by an exemplary access router, of a packet sent from a customer, as forwarded by an aggregation unit, and bound for a network.

§4. DETAILED DESCRIPTION

The present invention involves novel methods, apparatus and data structures for enhancing security by providing authorization extensions in a network. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, an exemplary environment in which the invention may operate is described in §4.1. Then, functions that may be performed by the present invention are introduced in §4.2. Thereafter, processes, structures, methods and data structures that may be used to effect those functions are described in §4.3. Thereafter, the end-to-end processing of a packet in a system including exemplary aggregation units and access routers is described in §4.4. Finally, some conclusions regarding various aspects of the present invention are provided in §4.5.

§4.1 Environment in Which the Invention May Operate

Figure 1:
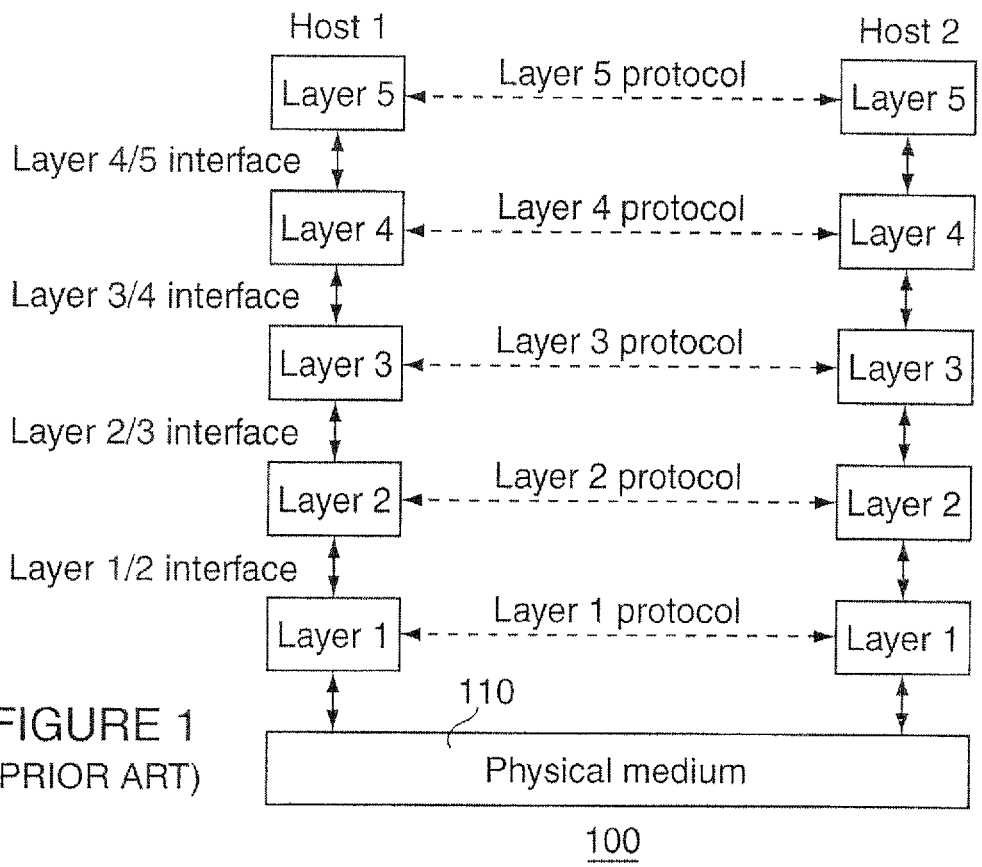
Figure 2:
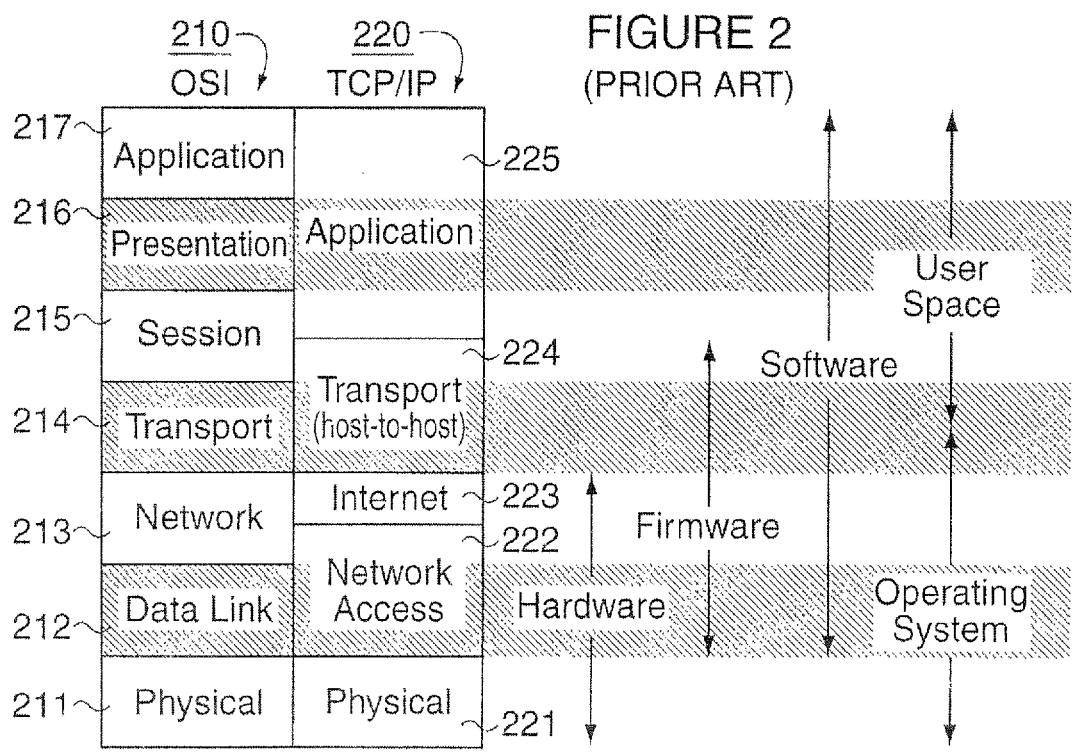
Figure 3:
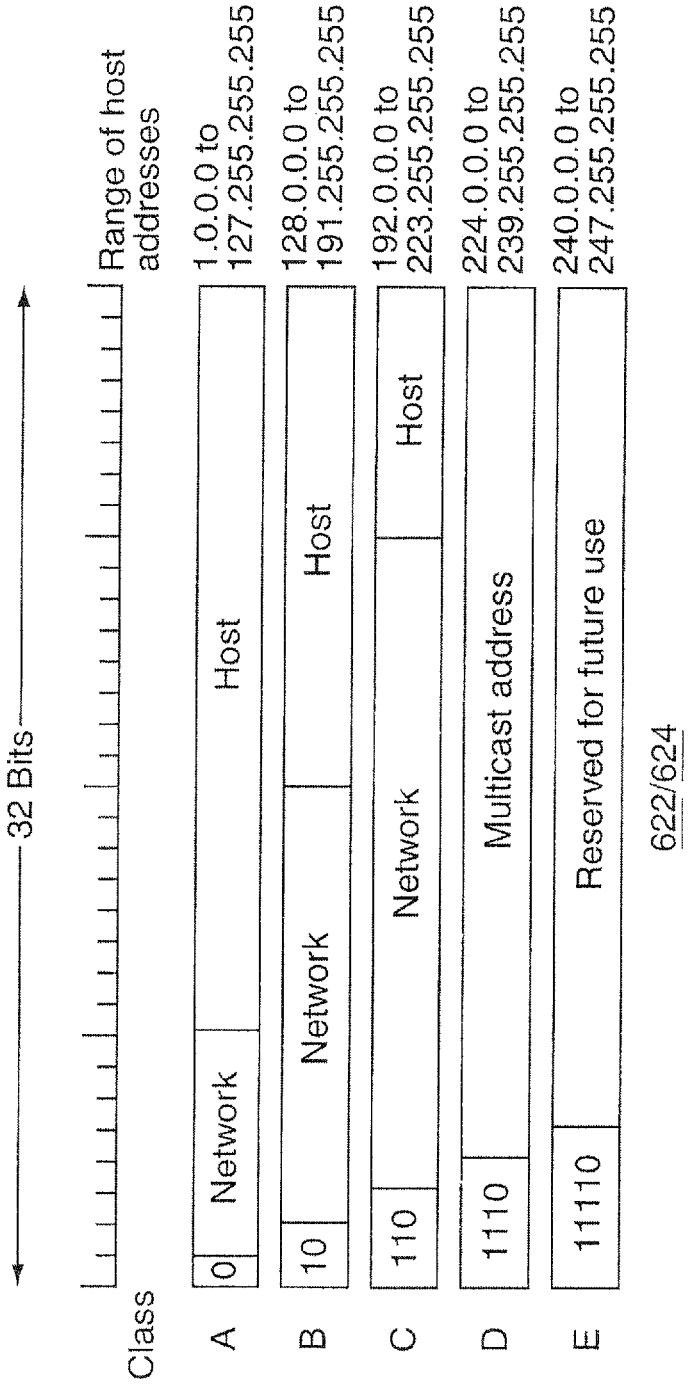
FIG. 3 illustrates internet protocol (or "IP") global addressing.
Figure 4:
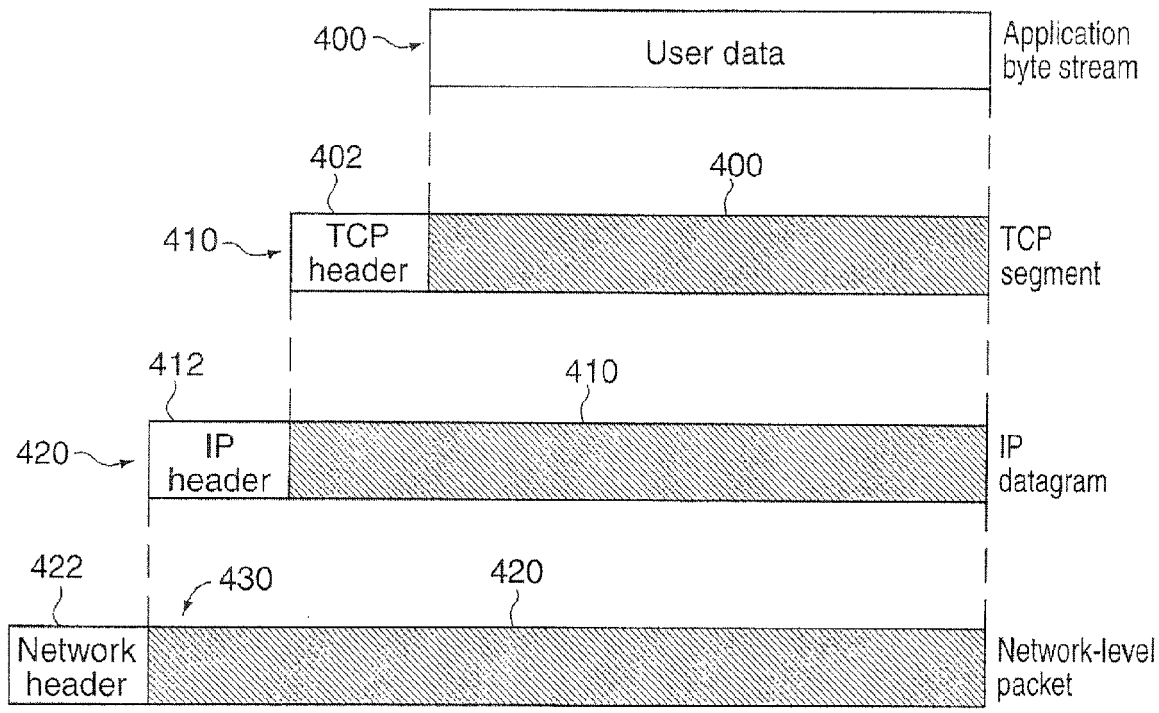
FIG. 4 illustrates the manner in which data is encapsulated by a TCP header, an IP header, and a network header in accordance with the TCP/IP protocol suite.
Figure 5:
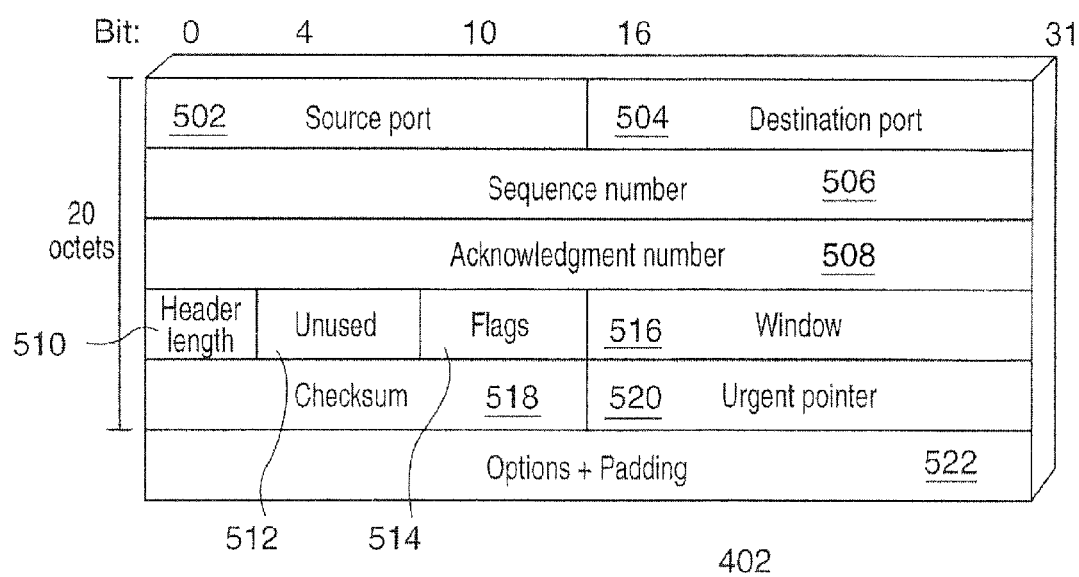
FIG. 5 illustrates the fields of a TCP header.
Figure 6A:
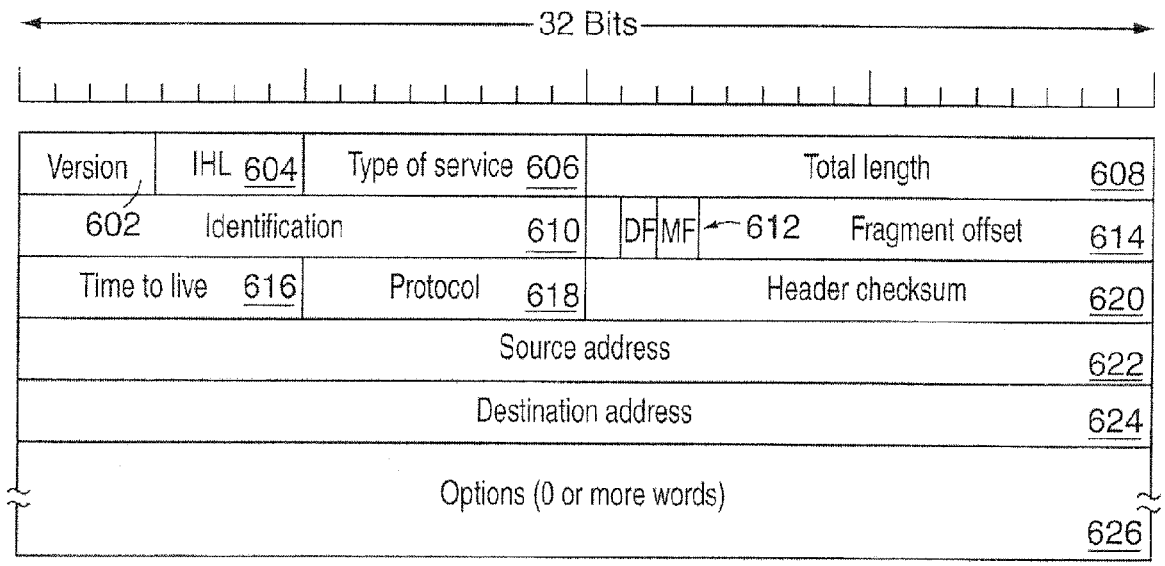
FIGS. 6A and 6B illustrate the fields of Version 4 and Version 6, respectively, of the IP header.
Figure 6B:
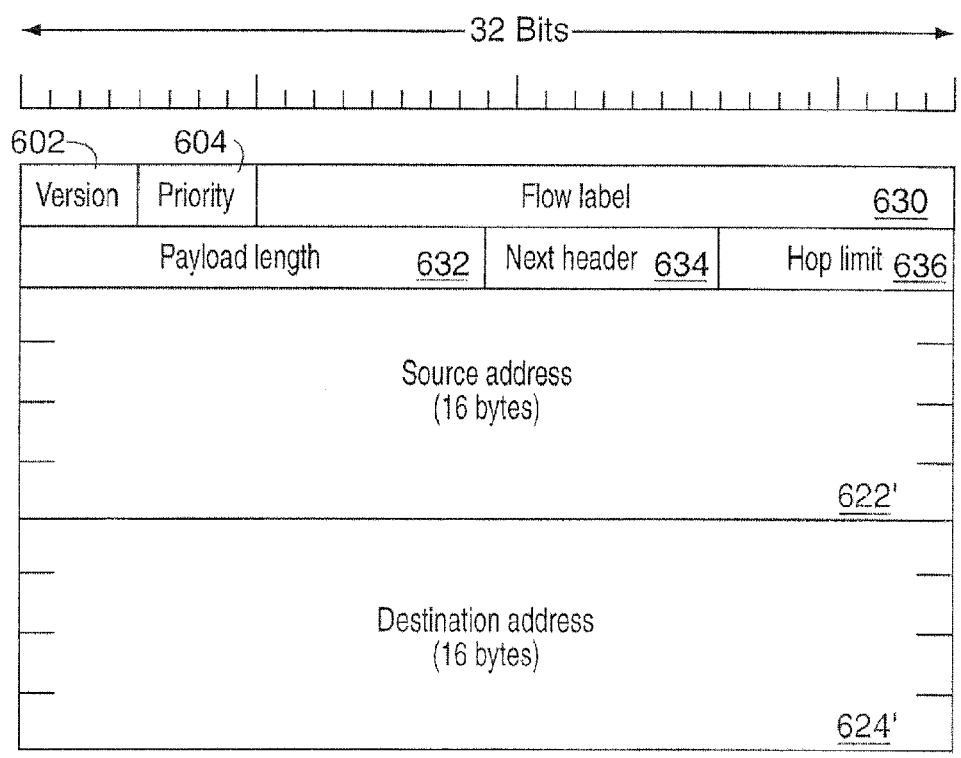
Figure 7B:
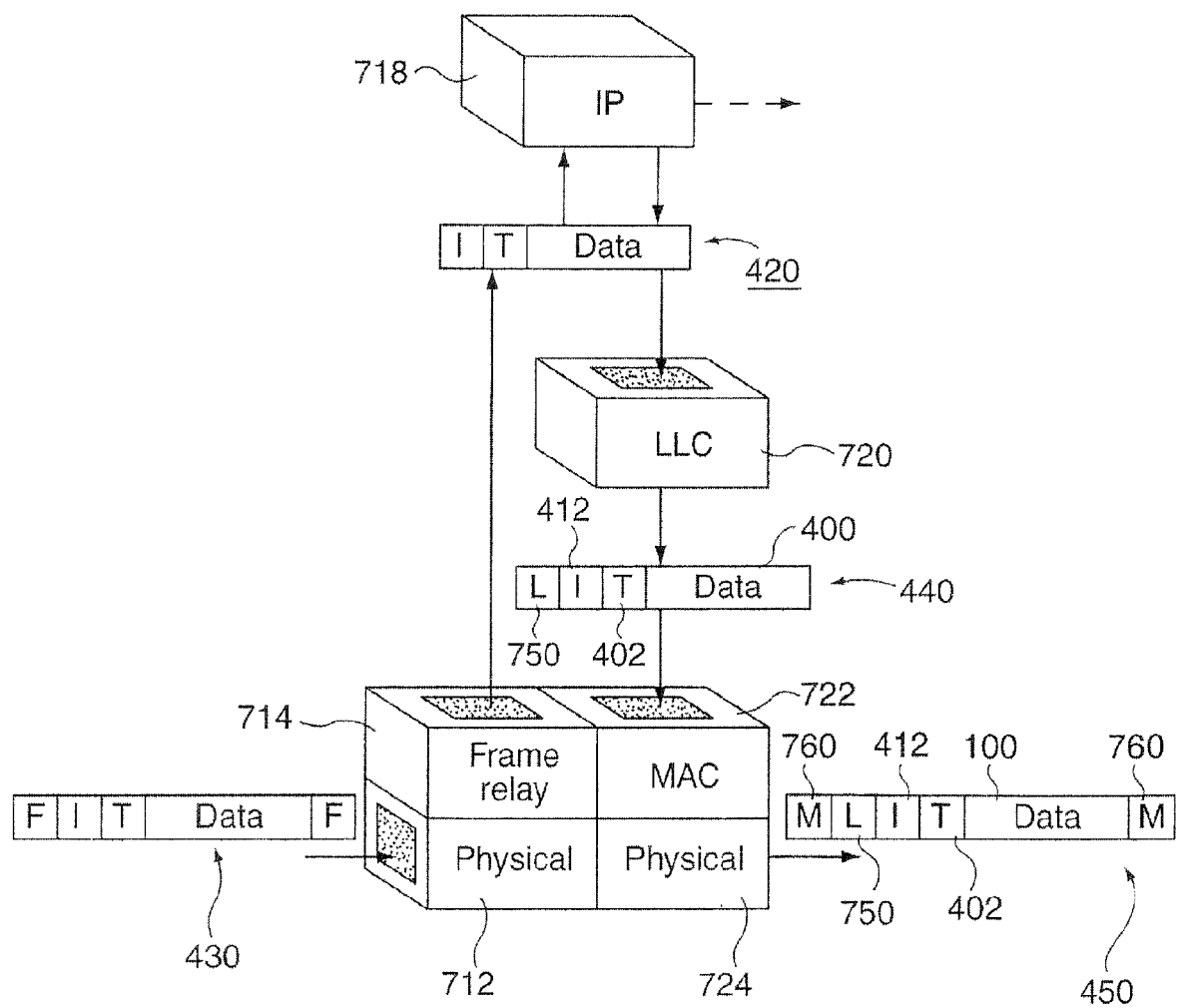
Figure 7C:
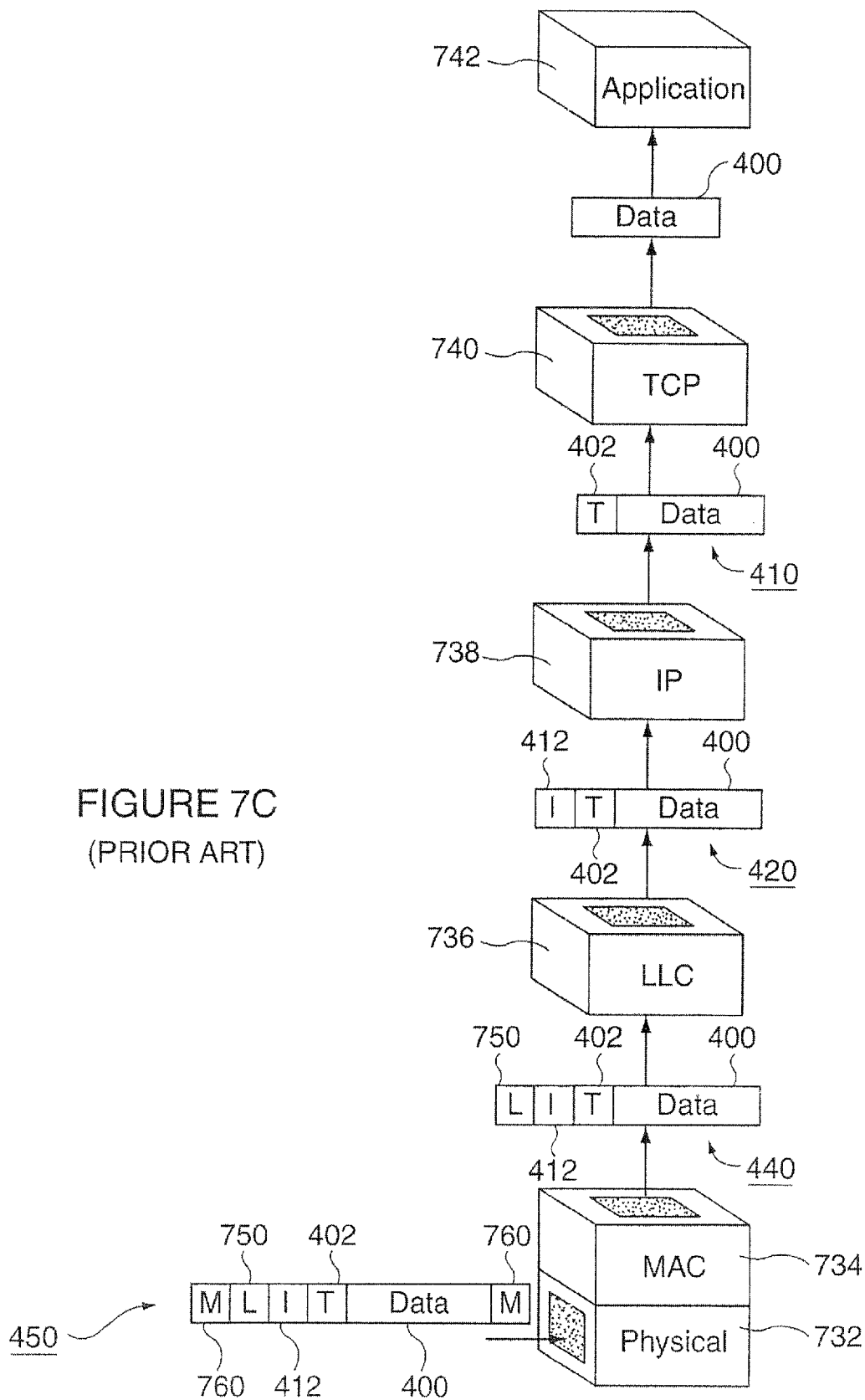
Figure 8:
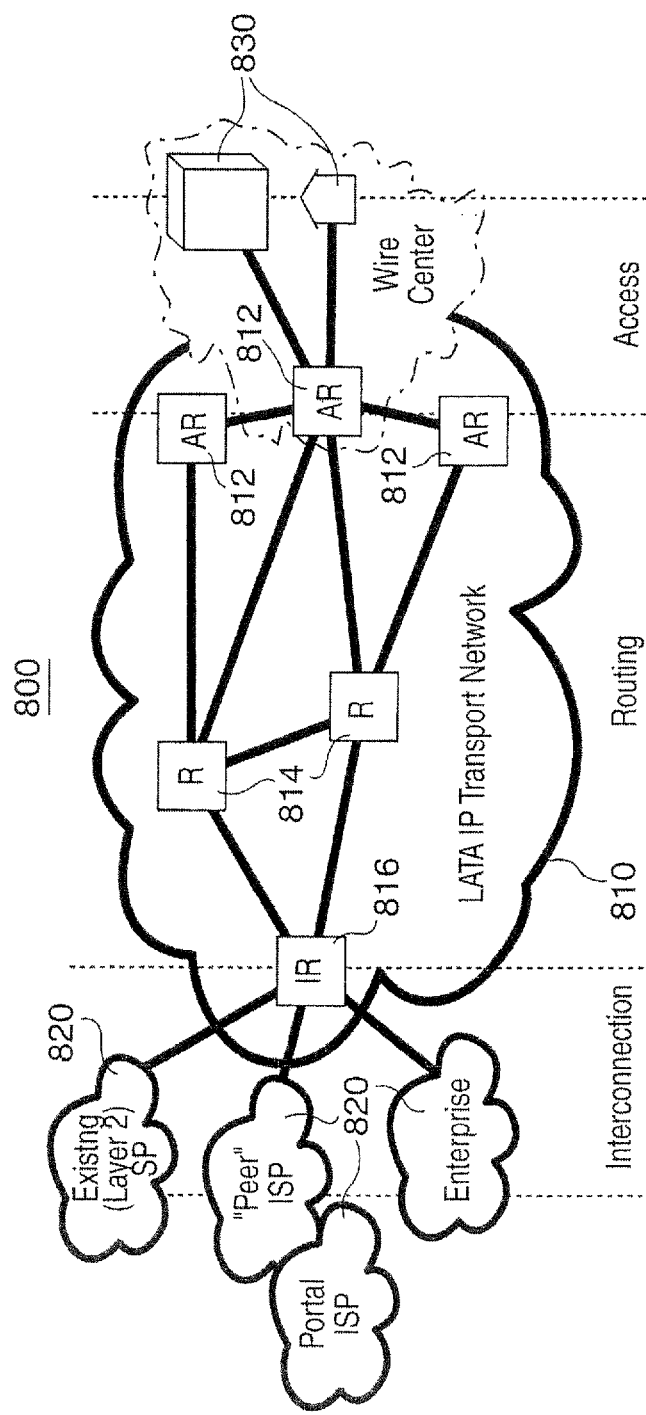
FIG. 8 is a high-level diagram of a network in which the present invention may operate.

FIG. 8 is a high-level diagram of an environment 800 in which the present invention may operate. This environment 800 may include a LATA IP network 810, additional networks 820 such as an enterprise network, a portal Internet service provider (or "ISP") network, a peer ISP network, and an existing layer 2 service provider network. The networks 820 may be interconnected with the LATA IP network 810 via interconnection router(s) 816. Customers 830, such as homes and businesses, may be connected with the LATA IP network 810 via "access routers" 812. Finally, routers 814 may be provided within the LATA IP network 810 for consolidating traffic and minimizing traffic transport for example. Aggregation units (not shown) aggregate physical connections from the customers 830 for presentation to an access router 812.

Figure 9:
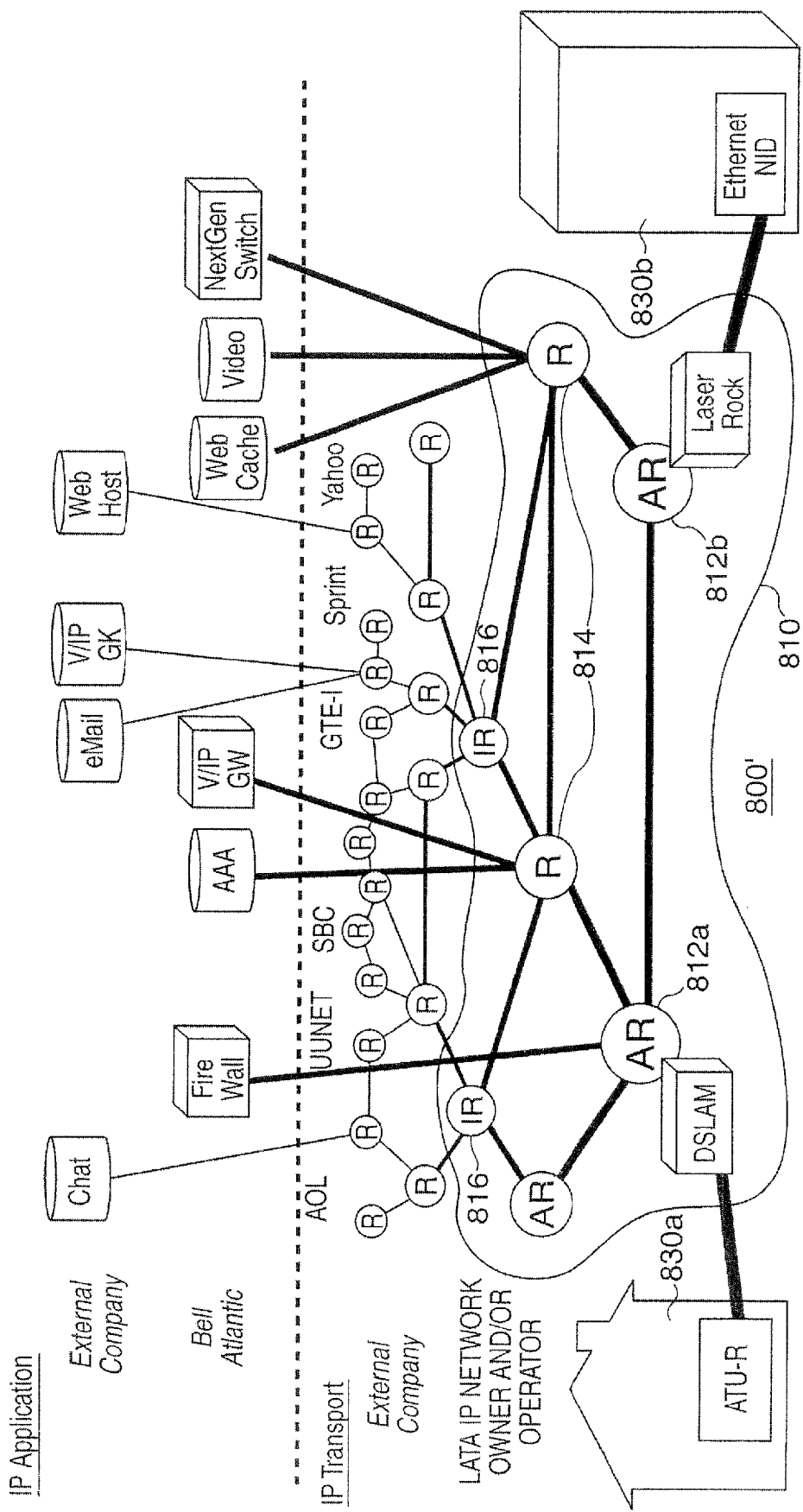
FIG. 9 is an example of the network of FIG. 8 in which services and applications are shown separated from transport.

FIG. 9 illustrates how the LATA IP network 810 can be used to separate transport facilities from applications and services. Again, the LATA IP network 810 may be defined, at least in part, by the access routers 812, the routers 814, and the interconnection routers 816. Notice that the networks of others, such as America On-Line, UUNET, SBC, GTE, Sprint and Yahoo may communicate with the LATA IP network 810 via the interconnection routers 816. As shown in the IP application section of FIG. 9, the LATA IP network 810 may provide firewall functionality (via access router 812), V/IP GW (voice over Internet—gateway), next generation switch functionality (via routers 814), AAA (authentication, authorization, and accounting), web caching and video storage facilities (via routers 814). The other companies may provide chat, e-mail, V/IP GK (voice over Internet—gatekeeper) and web hosting functionality via their own networks, and the interconnection routers 816.

The present invention may be used in other networks, such as the transport network disclosed in U.S. patent application Ser. No. 09/834,573, entitled "SIMPLE PEERING IN A TRANSPORT NETWORK EMPLOYING NOVEL EDGE DEVICES", by Robert T. Baum and Eric A. Voit, filed on Apr. 13, 2001.

Figure 10A:
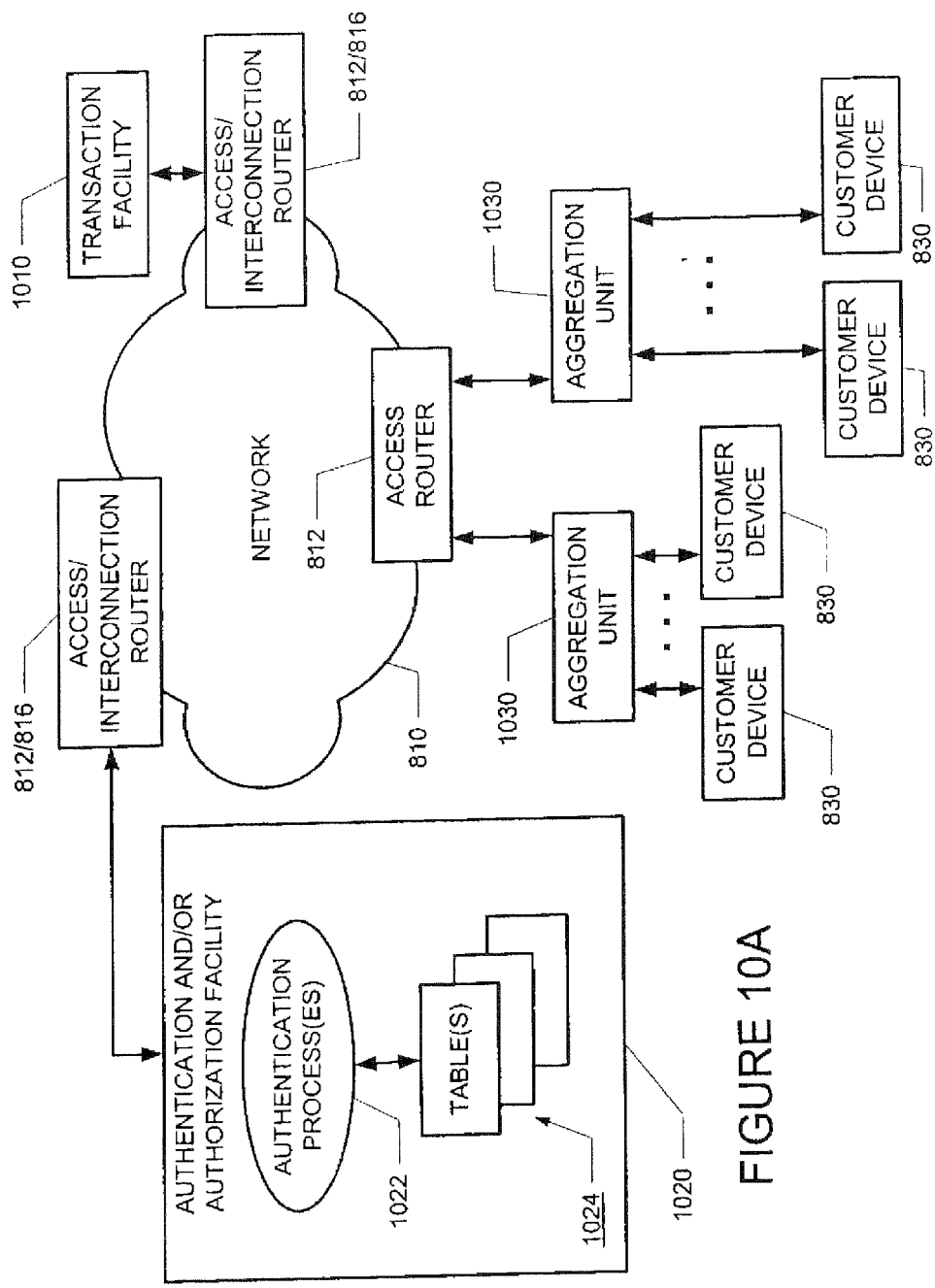
FIGS. 10A through 10C are high-level diagrams which illustrate examples of how the present invention may be implemented in the context of a network, such as those in FIGS. 8 and 9.

FIG. 10A is a diagram that illustrates an example of how the present invention may be used in the context of a network. In this example, the transaction facility 1010 and the authentication and/or authorization facility 1020 are both located outside the transport network 810. More specifically, the transaction facility 1010 may be coupled with an access router 812 or interconnection router 816 of the network 810. Similarly, the authentication and/or authorization facility 1020 may be coupled with an access router 812 or an interconnection router 816. The authentication and/or authorization facility 1020 may include authentication process(es) 1022, at least one of which may effect at least some aspects of the present invention. The authentication process(es) 1022 may use one or more stored data structures (e.g., tables) 1024 when performing authentication and/or authorization functions. As FIG. 10A further illustrates, a number of customer devices 830 may access the network 810 via aggregation unit(s) 1030 and access router(s) 812.

Figure 10B:
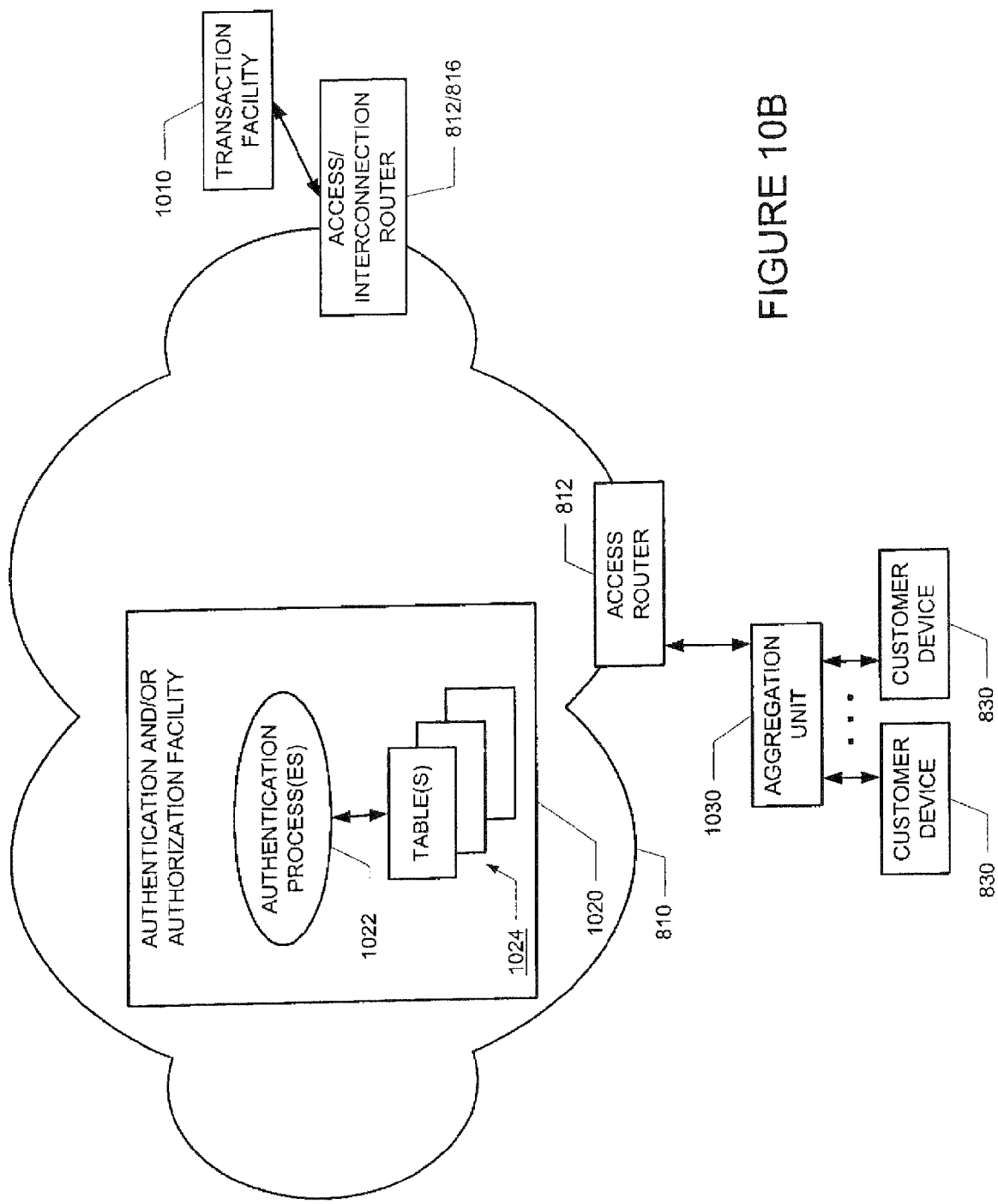

FIG. 10B is a diagram that illustrates another example of how the present invention may be used in the context of a network. In this example, the transaction facility 1010 is located outside the transport network 810, but the authentication and/or authorization facility 1020 is located within the transport network 810. More specifically, the transaction facility 1010 may be coupled with an access router 812 or interconnection router 816 of the network 810. On the other hand, the authentication and/or authorization facility 1020 may be coupled with a router 814 that defines part of the transport network 810. The authentication and/or authorization facility 1020 may include authentication process(es) 1022, at least one of which may effect at least some aspects of the present invention. The authentication process(es) 1022 may use one or more stored data structures (e.g., tables) 1024 when performing authentication and/or authorization functions. As FIG. 10B further illustrates, a number of customer devices 830 may access the network 810 via aggregation unit(s) 1030 and access router(s) 812.

Figure 10C:
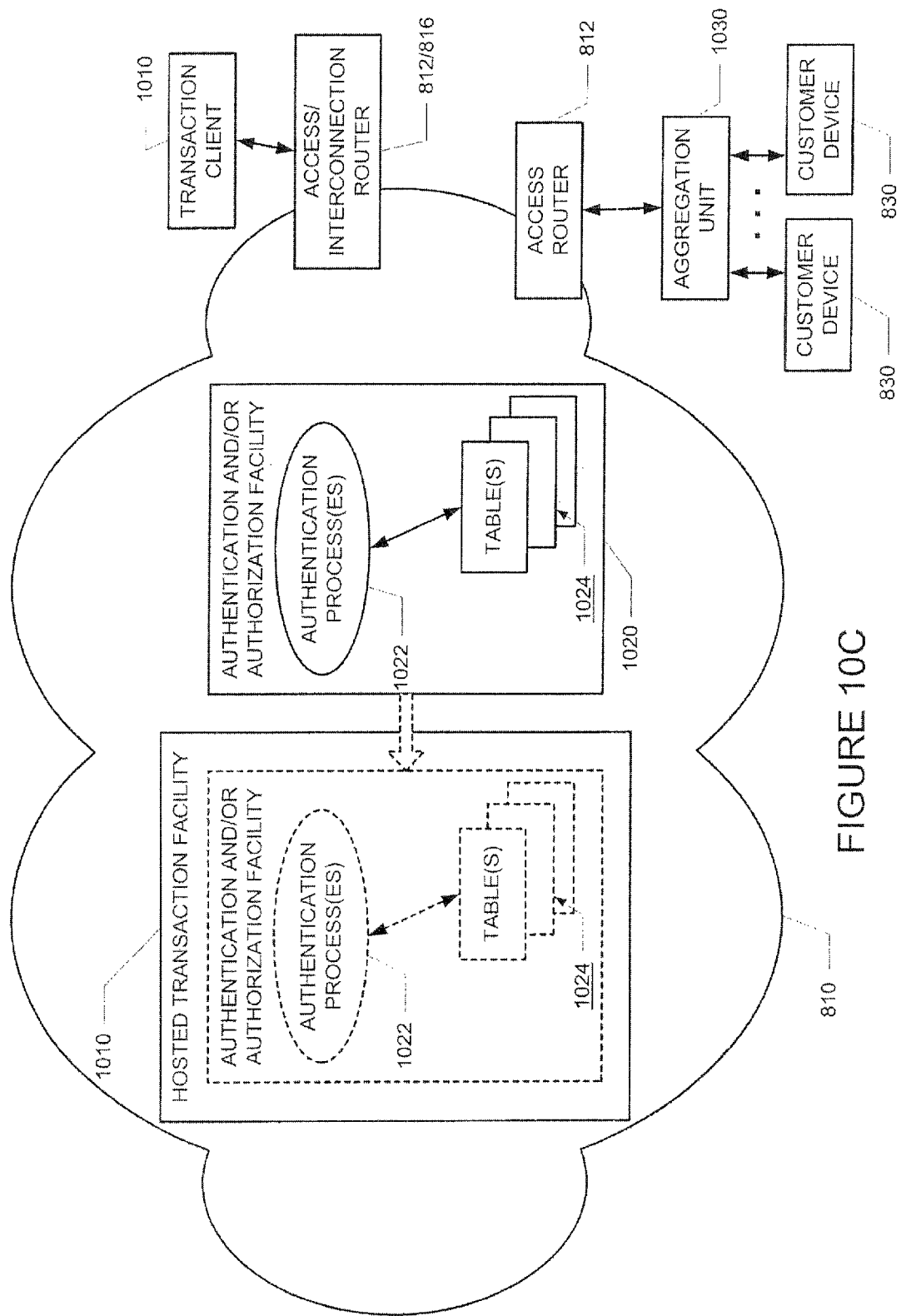

FIG. 10C is a diagram that illustrates yet another example of how the present invention may be used in the context of a network. In this example, a hosted transaction facility 1010a and the authentication and/or authorization facility 1020 are both located within the transport network 810, while a client transaction facility 1010b is located outside the transport network 810. More specifically, the hosted transaction facility 1010a may be coupled with a router 814 that defines part of the transport network 810. Similarly, an authentication and/or authorization facility 1020 may be coupled with a router 814 that defines part of the transport network. The client transaction facility 1010b may be coupled with an access router 812. The authentication and/or authorization facility 1020 may include authentication process(es) 1022, at least one of which may effect at least some aspects of the present invention. The authentication process(es) 1022 may use one or more stored data structures (e.g., tables) 1024 when performing authentication and/or authorization functions. As indicated by the phantom lines, the authentication and/or authorization facility 1020 may be a part of the hosted transaction facility 1010a. As FIG. 10C further illustrates, a number of customer devices 830 may access the network 810 via aggregation unit(s) 1030 and access router(s) 812.

Relevant features of the aggregation unit(s) 1030 and the access router(s) 812 are introduced below with reference to FIG. 11.

Figure 11:
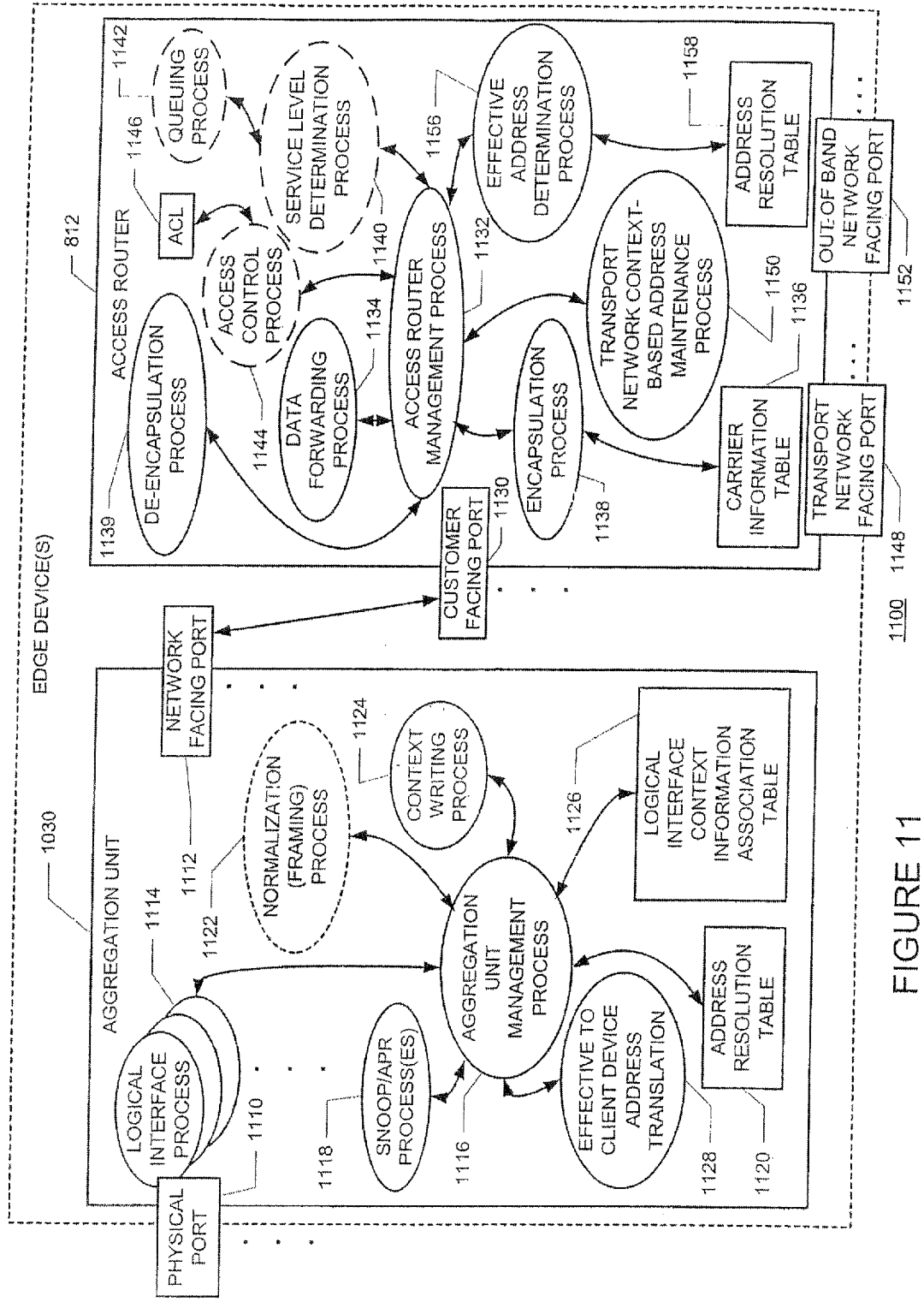
FIG. 11 is a high-level diagram of processes that may be performed by the network in which the present may be used.

FIG. 11 illustrates connections to, and processes that may be performed by, an aggregation unit 1030 and an access router 812, collectively referred to as edge devices 1100. The aggregation unit 1030 may be coupled with an access router 812 by one or more high bandwidth links. Redundant links may be used. Further, links from a number of customers 830 are coupled with ports 1110 of the aggregation unit 1030. Operations that may be performed by the aggregation unit 1030 and the access router 812 are described below in §§4.1.2 and 4.1.3, respectively. First, however, an example of context information is described in §4.1.1.

§4.1.1 Context Information

Context information may include (i) information to identify, uniquely, a customer, and (ii) information to identify, uniquely, an ingress logical interface. The present invention may exploit at least a part of this context information for purposes of authentication. Further, the context information may include (iii) information to identify a service level and/or a service type.

Figure 13:
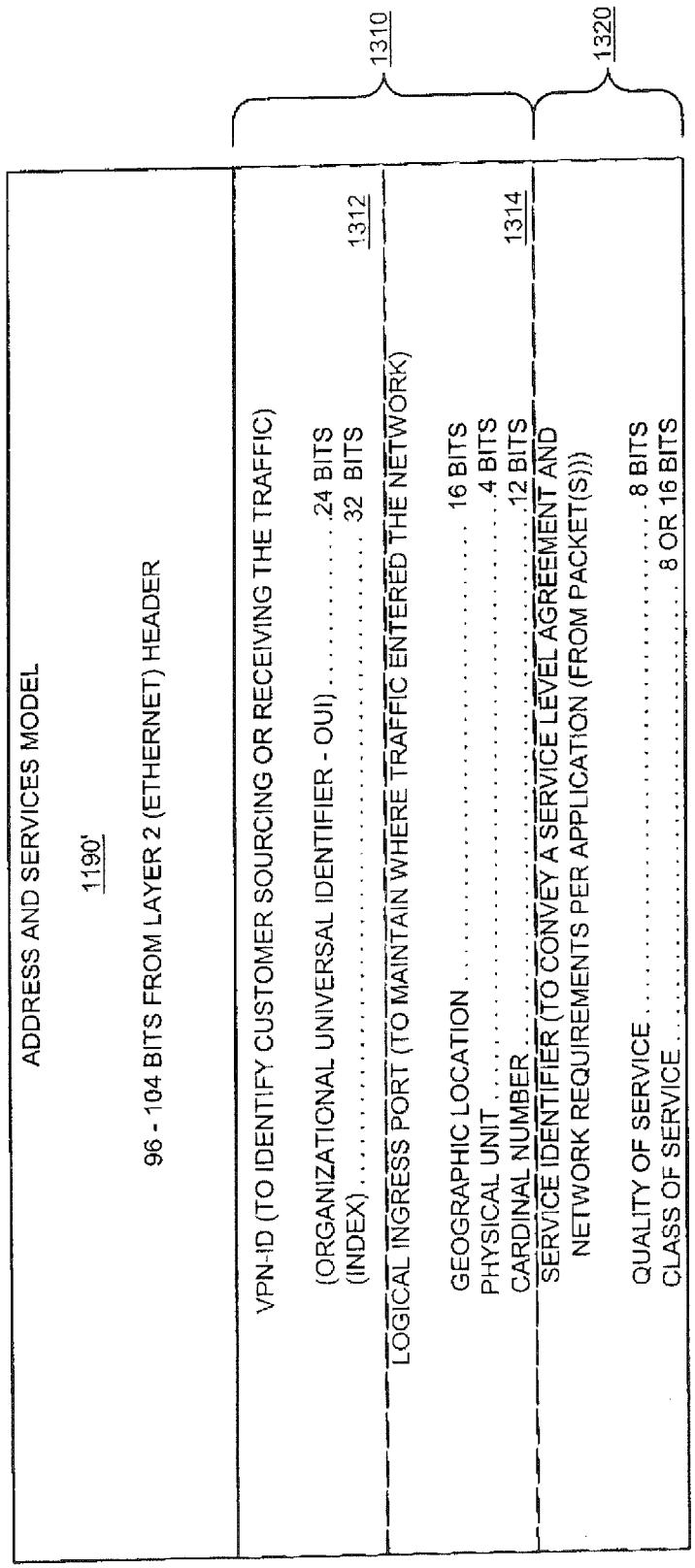
FIG. 13 illustrates an exemplary data structure specification of a unique bit string (or context information) that may be used in the present invention and that may be administered in accordance with a network-wide plan.

For example, referring to FIG. 13, the information to identify, uniquely, a customer may include a 24-bit organizational universal identifier (or "OUI") for the customer (or "VPN-OUI"), which may identify 16,777,216 customers, and a 32-bit VPN identifier (or VPN-Index), which may identify 4,294,967,296 VPNs per VPN-OUI as indicated by label 1312. The VPN-OUI can be thought of as an autonomous system identifier, is unique throughout all transport networks, and can be assigned to many logical ports. The VPN-Index defines a group serviced by a VPN-OUI, is unique within the domain of a given VPN-OUI, and can be assigned to many logical ports.

The information to identify, uniquely, an ingress logical interface 1114 may include a 32-bit logical interface identifier (or address), which may identify 4,294,967,296 logical interfaces as indicated by label 1314. The 32-bit logical interface identifier (or address) may comprise 16 bits that define one of 65,536 geographic locations, 4 bits that identify one of sixteen (16) physical units to which the logical interface is associated, and 12 bits that assign one of 4096 cardinal numbers to the logical interface within its physical unit. Naturally, the bits of the logical interface identifier may be provisioned based on ingress points, or expected future ingress points, to the public transport network. A logical ingress interface ID will be unique with the domain of a given client (e.g., either VPN-OUI, or VPN-OUI and VPN-Index), and serves to distinguish traffic with the same client (e.g., either VPN-OUI, or VPN-OUI and VPN-Index).

The customer identification information 1312 and the ingress logical interface identification information 1314 may be referred to collectively, as "customer addressing information". Since the customer addressing information 1310 does not depend on the contents of a received data (e.g., packet(s)), but rather only on the logical interface, this part 1310 of the context information can be thought of as a data (or packet)-independent part.

To reiterate, the context information may also provide a mechanism to support various levels of service. This part of the context information, described in U.S. patent application Ser. No. 09/834,573, entitled "SIMPLE PEERING IN A TRANSPORT NETWORK EMPLOYING NOVEL EDGE DEVICES", by Robert T. Baum and Eric A. Voit, filed on Apr. 13, 2001, is not described in detail here.

§4.1.2 Parts of an Exemplary Aggregation Unit

FIG. 11 illustrates an exemplary edge device 1100 that may be used in the environments of FIGS. 8, 9 and 10. As shown, the exemplary edge device 1100 may include an exemplary aggregation unit 1030. Many of the structural aspects of an exemplary aggregation unit are described in U.S. patent application Ser. No. 09/652,822, entitled "METHODS, APPARATUS AND DATA STRUCTURES FOR PROVIDING ACCESS TO AN EDGE ROUTER OF A NETWORK", by Robert T. Baum and Eric A. Voit filed on Aug. 31, 2000. Other aspects of an exemplary aggregation unit are described in U.S. patent application Ser. No. 09/834,573, entitled "SIMPLE PEERING IN A TRANSPORT NETWORK EMPLOYING NOVEL EDGE DEVICES", by Robert T. Baum and Eric A. Voit, filed on Apr. 13, 2001. It should suffice to note that the aggregation unit 1030 may include a relatively large number of customer-facing physical ports 1110 and a smaller number of network-facing ports 1112.

Each customer-facing physical port 1110 may have one or more associated logical interface process 1114 (also referred to as "logical interfaces" or "logical ports"), but a logical interface process 1114 may only be associated with one physical port 1110. Each logical interface process 1114 may be thought of as terminating a virtual channel (or "VC"). Thus, if the access facility technology supports virtual channels (e.g., ATM), then one physical interface 1110 can have multiple associated logical interface processes 1114, each supporting a virtual channel. If, on the other hand, the access facility technology does not support virtual channels (e.g., standard Ethernet), then the physical interface 1110 will have only one associated logical interface process 1114. The number of logical interface processes 1114 that a given aggregation unit 1030 can have may depend upon the design of context information, which was described above in §4.1.1.

Figure 15:
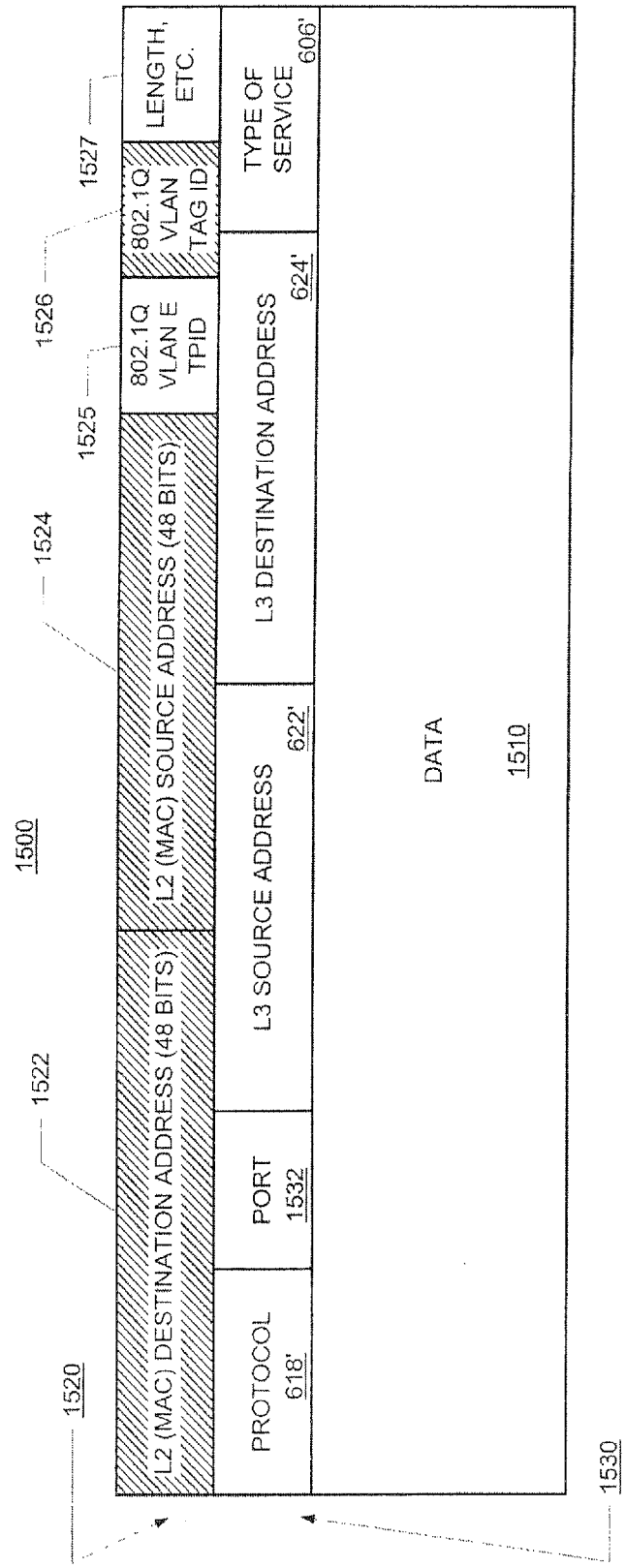
FIG. 15 illustrates an exemplary packet which may be sent by a customer and received by an aggregation unit.

The various processes of the aggregation unit 1030 may be managed by an aggregation unit management process 1116. This process 1116 may determine whether data, which will typically be a packet, is received from a customer device (i.e., at a customer-facing port) or from the public transport network (i.e., at a network-facing port). If the data is received from a customer device (See, e.g., FIG. 15.), the data may be snooped to determine the (layer 2) source address of the data (e.g., a snoop process 1118 is called). For example, the source address of the incoming data, as well as the associated logical interface process 1114 which received the data, may be saved (e.g., in an address resolution table 1120, or simply in association with (e.g., a register of) the logical interface 1114). This customer device address—logical interface process 1114 association is used to forward data from a logical interface process 1114 to the associated customer device.

The data may be normalized (e.g., formatted or framed) (e.g., the normalization process 1122 may be called). For example, the (layer 2) access technology information may be removed from the data—it is no longer needed. Then, the remaining data may be normalized, for example, via framing or packetizing. The "normalized" frame may correspond to an Ethernet frame.

Context information may be added to the data (e.g., the context writing process 1124 may be called). (See, e.g., FIG. 16.) For example, the identity of the logical interface 1114 that received the data may be used to look up context information in a logical interface ID—context information association table 1126. This table 1126 may be populated during a configuration of the edge device. An entity that administers and manages the public transport network may control these associations.

An exemplary logical interface ID—context information association table 1126 may include a number of entries, each of the entries including a logical interface identification and context information associated with the logical interface (e.g., during a configuration). The context information is appended and/or prepended to the data, and/or the context information replaces bits (e.g., bits that may have been removed by the normalization process 1122) of the data. The data may then be forwarded to an access router 812. For example, data from logical interfaces 1114 may be aggregated to define a logical trunk(s) on a high bandwidth link(s) to an access router 812.

After the data has traversed the public transport network, it must get from the edge of the transport network to the customer device to which it was addressed. To this end, the context information may include (i) information to identify, uniquely, a customer, and (ii) information to identify, uniquely, an ingress logical interface as stated above in §4.1.1. Further, various service level and service type agreements may be supported. To this end, the context information may further include (iii) information to identify a service level and/or a service type.

If the data is instead received from the network, the operation 1116 has to forward the data to the destination customer device. In this regard, it is determined whether or not a customer device address, associated with a given logical interface 1114, is available (e.g., at the logical interface 1114 or within the address resolution table 1120). The access router 812 associates the data with the correct logical interface 1114 using an effective address determination process 1156.) If not, the address of the customer device is resolved (e.g., an ARP process is called). More specifically, a request may be broadcast by the logical interface 1114 and the associated customer device may respond (along with any other customer devices sharing the physical port 1110 with which the logical interface 1114 is associated). The (layer 2 and layer 3) address(es) of the customer device(s) is included in its response.

If the customer device address (associated with the logical interface 1114) is available, the effective (layer 2) destination address is changed to the (layer 2) address of the client device (e.g., an effective address to client device address translation process 1128 is called). The effective (layer 2) address may be converted to the client device 830 (layer 2) address based on the address resolution table 1120 (or based on information stored at the logical interface 1114). The data is then forwarded to the client device.

Although the processes were described with reference to the aggregation unit 1030 as a whole, all processes (except egress queuing) are preferably distributed and performed per logical interface 1114.

§4.1.3 Parts of an Exemplary Access Router

The exemplary access router 812 may include customer-facing ports 1130 having links to aggregation unit(s) 1030, network-facing ports 1148 having links to components or nodes of the transport network (e.g., core routers), and ports 1152 having links to components of an out-of-band network.

The various processes of the access router 812 may be managed by an access router management process 1132. This process 1132 may first determine whether or not the data (packet) is received from the public transport network (on a network-facing port 1148) or from a customer device (on a customer-facing port 1130) (e.g., via the aggregation unit). The carrier information table 1136 may include a number of entries, each of the entries including at least a part of the context information (e.g., a VPN-Index and/or VPN-OUI) and a (layer 3) destination address 1412, and an associated egress access router (layer 3) address. When a packet is received from a customer device, then carrier information is determined and the data is encapsulated in transport network carrier information (e.g., an encapsulation process 1138 is called). (See, e.g., FIG. 17.) For example, at least a part of the context-information and the (layer 3) destination address may be used to look up an egress access router (layer 3) address in the carrier information table 1136. Then, the data (with the added context information) is encapsulated in a transport network carrier. The transport network carrier may include the (layer 3) destination address information of an egress edge device and service level information.

An access control process 1144 may use at least a part of the context information, in conjunction with an access control list 1146, to determine whether or not the data is permitted to go where it wants, at the rate it wants, and/or with the service type it wants.

A service level may be determined and the data may be queued accordingly.

The encapsulated data is then forwarded towards its destination (e.g., via a node in the public transport network). Within the public transport network, nodes, such as core routers for example, may forward the encapsulated data, based on information in the carrier. The encapsulated data will ultimately arrive at an egress edge of the public transport network. The data forwarding process 1134 may be called to effect this act.

If, on the other hand, the data (packet) is received from the public transport network, access rights may be checked. Then, the data may be de-encapsulated (e.g., a de-encapsulation process 1139 may be called). This effectively removes the carrier information—such information is no longer needed since the data has already traversed the public transport network. An effective (layer 2) address of the proper logical interface 1114 is determined (e.g., an effective address determination process 1156 is called). For example, at least a part of the context information (e.g., the VPN-OUI and/or VPN-Index) and the (layer 3) destination address may be used to lookup an effective address of an appropriate logical interface 1114 in address resolution table 1158. The table 1158 may include a number of entries, each of the entries including at least a part of the context information and a (layer 3) destination address, and an associated effective (layer 2) logical interface 1114 address. The effective logical interface address may be defined as the 16 least significant bits of the VPN-OUI, prepended to the 32-bit egress logical interface identifier. The address resolution table 1158 may be populated based on updates from the edge information update facility, assuming that the customer device has a routed interface (e.g., a router, a PC, etc.). If, on the other hand, the customer device has a non-routed interface (e.g., switch, hub, etc.), the access router may use the aggregation device as a proxy for an ARP request. The data is then forwarded to the aggregation unit 1030 based on the effective (layer 2) logical interface 1114 address. Recall from §4.3.2 above that the aggregation unit converts this effective address to the (layer 2) address of the customer device associated with the logical interface 1114.

Having described a system in which the present invention may be used, functions that may be performed by the present invention are introduced in §4.2 below. Then, exemplary processes, data structures, methods and architecture for effecting the functions of the present invention are described in §4.3 below. Thereafter, examples of an end-to-end operation of the present invention will be illustrated in §4.4 below. Finally, some conclusions regarding the present invention are presented in §4.5 below.

§4.2 Functions which may be Performed by the Present Invention

The present invention may function to enhance security by performing an authentication process that uses at least in part, information for identifying a user or customer provided by the network. This information provided by the network is not susceptible to control by an unauthorized user, thereby deterring or preventing fraud. More specifically, this information may be applied to a packet at an ingress port of a network. The information applied to a packet may be "context information" which replaces at least some bits of a layer 2 header, as is the case in the systems described in the patent applications listed in §0 above and summarized in §4.1 above.

The present invention may also function to help users implement security policies based on (i) the type(s) of transaction, (ii) the location from which the transaction originated, and/or (iii) a class of users who are a party to the transaction. Thus, for example, transactions may be managed from various levels (e.g., service provider, group context, individual).

Even fraudulent transactions may be tracked based on such context information.

Figure 18:
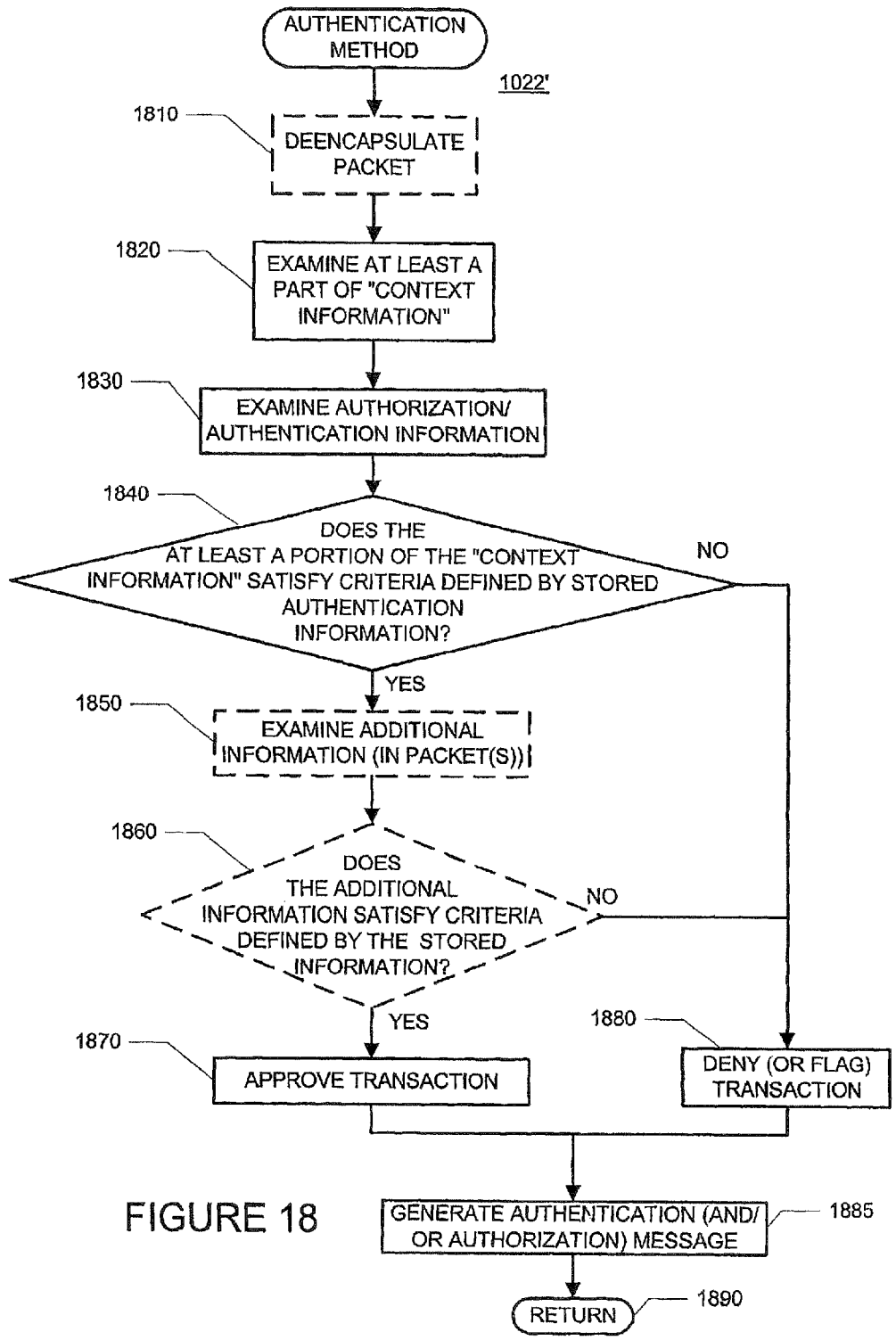
FIG. 18 illustrates an exemplary method that may be used to effect the authentication process of the present invention.

§4.3 Methods, Data Structures and Architecture for Effecting the Functions of the Present Invention FIG. 18 is a high-level flow diagram of an exemplary method 1022' that may be used to effect at least a part of the authentication process(es) 1022. As shown in optional act 1810, a received packet is de-encapsulated. For example, the layer 2 and layer 3 headers (See, e.g., FIG. 17.) may be removed. Then, at least a part of the context information from the received packet is examined as shown in block 1820. Stored authorization and/or authentication information is also examined as shown in block 1830. The part(s) of the context information examined and the authentication information to be examined may, based on customer policies, depend on the type of transaction (e.g., no more than a predetermined amount, more than the predetermined amount, shipped to a credit card billing address, shipped to an address other then the credit card billing address, used to purchase a particular type or class of goods or services, etc.) to be authorized, the location from which the transaction originated, and/or a class of a user who is a party to the transaction. Thus, for example, a user or customer could specify that only transactions originating from a certain location (e.g., their house) or a certain region (e.g., their county) will be approved.

The type of transaction may be determined based on information provided by the transaction facility 1010 for example. Such type of transaction information may be carried in the data field of one or more packets for example.

In conditional branch point 1840, it is determined whether or not the at least a portion of the context information satisfy criteria defined by (e.g., "matches") the stored authentication information. If not, the transaction is denied (or merely flagged) as shown in block 1880. As indicated by block 1885, the method 1022 may then generate an authentication and/or authorization message which may be provided to, and used by, a (hosted) transaction facility, before it is left via RETURN node 1890. If, on the other hand, it is determined that the at least a portion of the context information satisfy criteria defined by (e.g., "matches") the stored authentication information, then the transaction may be approved as shown in block 1870. As indicated by block 1885, the method 1022 may then generate an authentication and/or authorization message which may be provided to, and used by, a (hosted) transaction facility, before it is left via RETURN node 1890.

Although the authentication method 1022' may use just a portion(s) of the context information by itself, it is contemplated that this authentication may be used as an extension to other techniques. In this case, additional information (e.g., provided by the user and included, for example, in the data field of the packet(s)) may be examined as shown in optional block 1850. Such additional information may include a user name, a user ID, a password, etc. In optional conditional branch point 1860, it is determined whether or not the additional information matches stored information. If not, the transaction is denied as shown in block 1880. If, on the other hand, the additional information matches stored information, the transaction is approved as shown in block 1870. Note that such additional information is not required. Thus, authentication of network users or customers can be accomplished without any client signaling software. In this way, sensitive client information such as password and other personal information, are not required. Indeed, the network service provider could securely store information needed to consummate a transaction that a user or customer would otherwise need to communicate. Such information would be associated with at least some of the context information.

Figure 19:
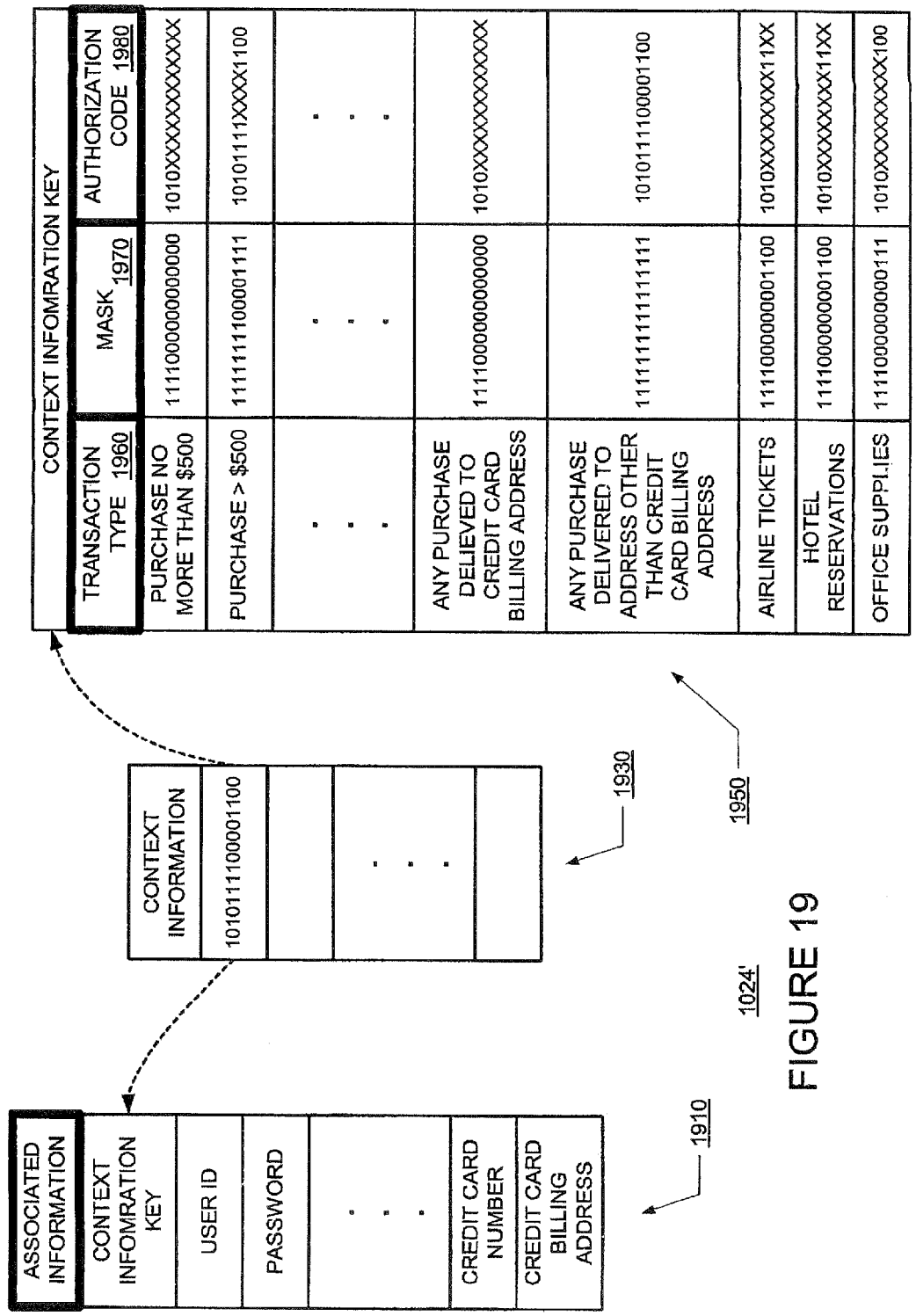
FIG. 19 illustrates exemplary data structures that may be used by the authentication process of the present invention.

FIG. 19 illustrates exemplary data structures 1024 that may be used by the authentication process 1022 to effect at least some aspects of the present invention. To simplify this drawing, the context information is represented by only sixteen bits, rather than the 96 to 104 bits described above with reference to FIG. 13 or the 88-bit part 1310. An array 1930 of context information has a number of entries corresponding to a number of different assigned context information values. Each entry may include a pointer to, or be a key to, associated tables. One such table 1910 includes associated information (Recall, e.g., block 1850 of FIG. 18.) 1910. Such associated information may include, for example, a user ID, a password, a credit card number, a credit card billing address, etc. Another such table 1950 may include a number of columns. One column 1960 may include transaction types, anther column 1970 may include masks associated with the various transaction types, and a third column 1980 may include authorization codes with which the context information from the packet, as masked, is compared.

Some exemplary transaction types are illustrated. For example, purchases may be segregated into those no more than a predetermined amount (e.g., $500.00) and those more than the predetermined amount. In this exemplary table (defining a customer policy), notice that more of the context information is extracted (less bits are masked) for the more expensive (e.g., >$500.00) purchases. As another example of transaction type, transactions may be based on whether a purchased item is to be delivered to the billing address of the credit card or not. Again, notice that more of the context information is extracted (less bits are masked) when the item being purchased is to be delivered to an address other than the billing address of the credit card. In yet another example of transaction type, the transactions may be divided into purchase types such as airline tickets, hotel reservations and office supplies. Thus, a company may authorize certain of its employees (Recall, e.g., part 1310 of FIG. 13), such as sales representatives for example, to purchase airline tickets and make hotel reservations, while authorizing certain of its employees, such as office managers for example, to purchase office supplies. Note that a given transaction may fall into more than one transaction type. For example, office supplies may be for more than $500.00 and may be shipped to the credit card billing address. In such cases, each of the tests must be passed for authorization to be approved (e.g., the masks for each of the relevant transaction types may be logically ORed and the authorization codes for each of the relevant transaction types may be logically ORed). Thus, as can be appreciated from the foregoing examples, the level or type of authentication required may be a function of the type of transaction to be authorized.

Naturally, other methods may be used to effect the authentication process 1022 and other data structures 1024 may be used by the authorization process 1022. The important feature is that at least a part of the context information, which may be controlled and provisioned by the network service provider, is used for authentication. The part or parts of the context information used, and therefore the degree or level of authentication, may depend on the transaction type. The user or customer could specify authorization policies to be carried out by the network service provider.

Figure 12:
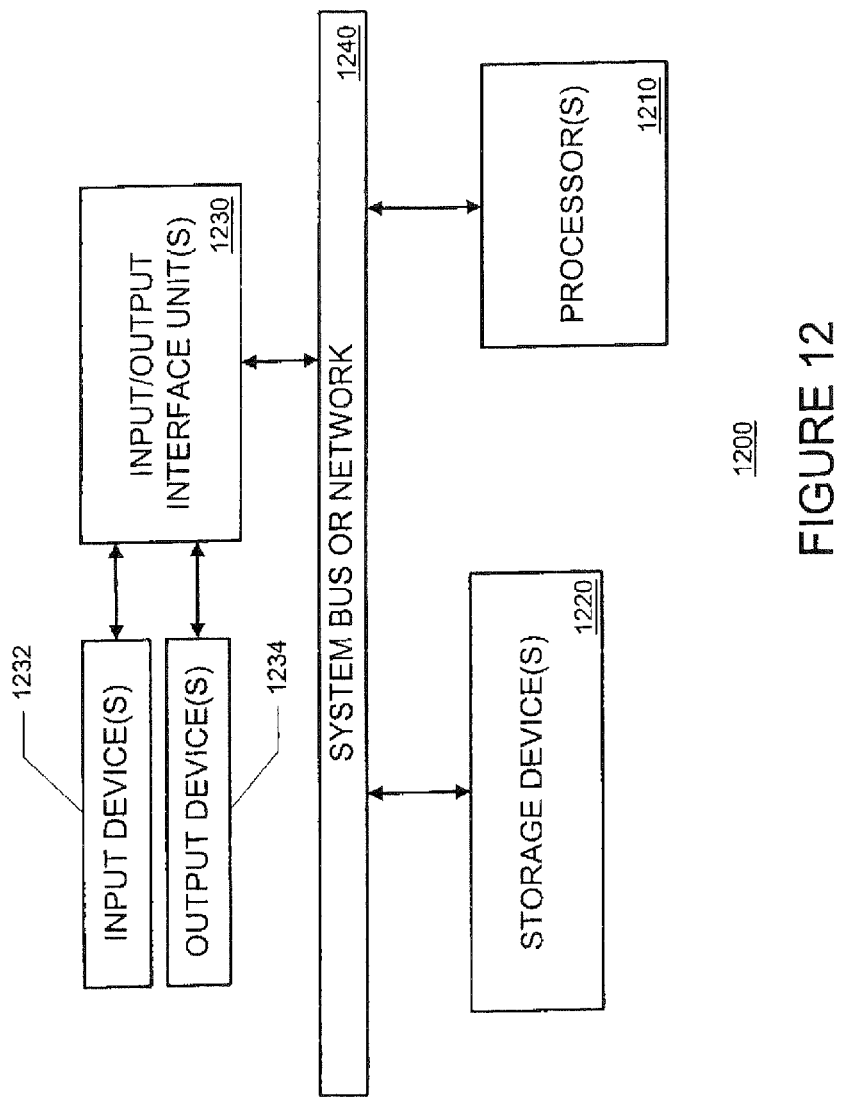
FIG. 12 is a high-level block diagram of a machine that may be used to perform the authentication and/or authorization process of the present invention.

FIG. 12 is high-level block diagram of a machine 1200 which may effect one or more of the processes discussed above. The machine 1200 basically includes a processor(s) 1210, an input/output interface unit(s) 1230, a storage device(s) 1220, and a system bus or network 1240 for facilitating the communication of information among the coupled elements. An input device(s) 1232 and an output device(s) 1234 may be coupled with the input/output interface(s) 1230.

The processor(s) 1210 may execute machine-executable instructions to effect one or more aspects of the present invention. At least a portion of the machine executable instructions may be stored (temporarily or more permanently) on the storage device(s) 2220 and/or may be received from an external source via an input interface unit 1230.

In one embodiment, the machine 1200 may be one or more conventional personal computers. In this case, the processing unit(s) 1210 may be one or more microprocessors, the bus 1240 may include a system bus that couples various system components including a system memory to the processing unit(s). The storage devices 1220 may include system memory, such as read only memory (ROM) and/or random access memory (RAM). The storage device(s) 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media. The drives and their associated storage media may provide nonvolatile storage of machine-readable instructions, data structures, program modules and other data for the personal computer.

A user may enter commands and information into the personal computer through input devices 1232, such as a keyboard and pointing device (e.g., a mouse) for example. Other input devices such as a microphone, a joystick, a game pad, a satellite dish, a scanner, or the like, may also (or alternatively) be included. The output device(s) 1234 may include a monitor or other type of display device, which may also be connected to the system bus 1240 via an interface 1230, such as a video adapter for example. In addition to (or instead of) the monitor, the personal computer may include other (peripheral) output devices (not shown), such as speakers and printers for example.

Having described an exemplary method 1022' for effecting the authentication process 1022, exemplary data structures 1024' which may be used by the authentication process 1022, and an exemplary apparatus 1200 for effecting the authorization process 1022 and storing the data structures 1024, an example of an operation of an exemplary embodiment of the invention in the context of the system of FIGS. 8 and 9 is described in §4.4 below with reference to FIG. 14.

§4.4 Examples of Operation

In the following, examples illustrating possible operations of the present invention are provided. More specifically, §4.4.1 illustrates an example of how the present invention may operate in the context of an environment, such as that described above with reference to FIG. 10A, in which both the transaction facility and the authentication facility are located outside the transport network. Section 4.4.2 illustrates examples of how the present invention may operate in the context of an environment, such as that described above with reference to FIG. 10B, in which the transaction facility is located outside the transport network, but the authentication facility is located within the transport network. Finally, section 4.4.3 illustrates an example of how the present invention may operate in the context of an environment, such as that described above with reference to FIG. 10C, in which the authentication facility and a hosted transaction facility are located within the transport network, but a client transaction facility is located outside the transport network.

Figure 14A:
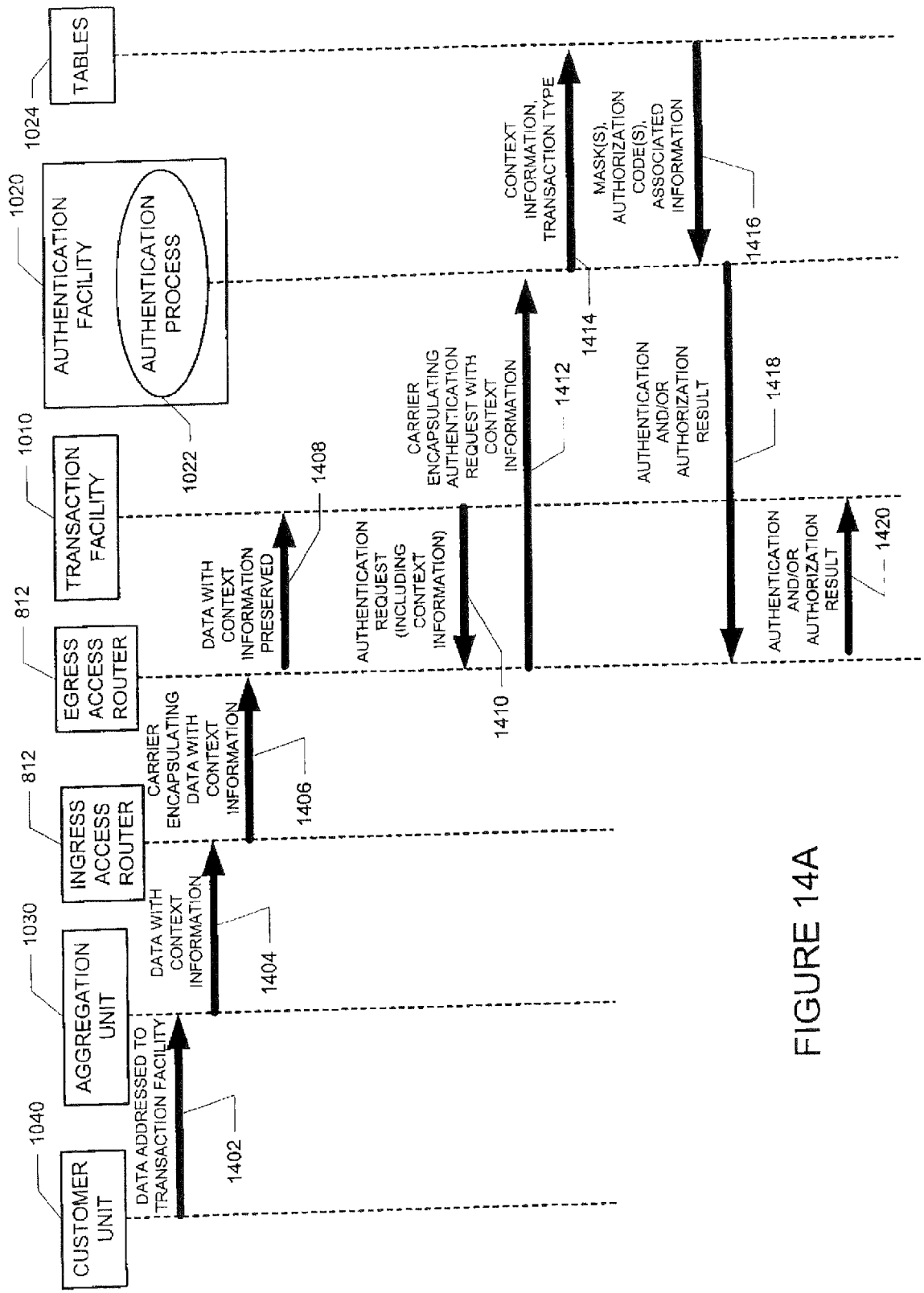
FIGS. 14A through 14D are data messaging diagrams which illustrate operations of the present invention in the context of different network environments, such as those illustrated in FIGS. 10A through 10C.

§4.4.1 Examples of Operation: Authentication and Transaction Facilities Located Outside Transport Network FIG. 14A is a messaging diagram that illustrates an example of how the present invention may operate in the context of an environment, such as that described above with reference to FIG. 10A, in which both the transaction facility 1010 and the authentication facility 1020 are located outside the transport network. As indicated by communication 1402, a customer unit 1040 sends message including data addressed (e.g., with a layer 3 address) to a transaction facility, to an aggregation unit 1030. As indicated by communication 1404, the aggregation unit 1030 forwards the data, with context information, to an ingress access router 812. Then, as indicated by communication 1406, the ingress access router encapsulates the data and context information within a carrier which is used by the transport network to forward the data and context information to an egress access router 812 associated with the addressed transaction facility 1010. At the egress access router 812, and/or an associated aggregation unit 1030 (not shown), the context information is preserved (e.g., not overwritten) in any one of a number of ways that will be apparent to those skilled in the art and, as indicated by communication 1408, is forwarded to the transaction facility 1010 outside the transport network.

The transaction facility can then send an authentication request 1410, which will include the context information, to the authentication facility 1020, via the access router 812, as indicated by communications 1410 and 1412. Notice that the access router 812 may encapsulate the request in a carrier. As indicated by communications 1414 and 1416, the authentication process 1022 can get the information it needs to make an authentication determination. (Recall, e.g., FIG. 18.) It can then provide its authentication (and/or authorization) result to the requesting transaction facility 1010 via the egress access router 812 as indicated by communications 1418 and 1420. Note that the request and results needn't be sent through the transport network, but can be communicated between the transaction facility 1010 and the authentication facility 1020 in any one of a number of ways.

Figure 14B:
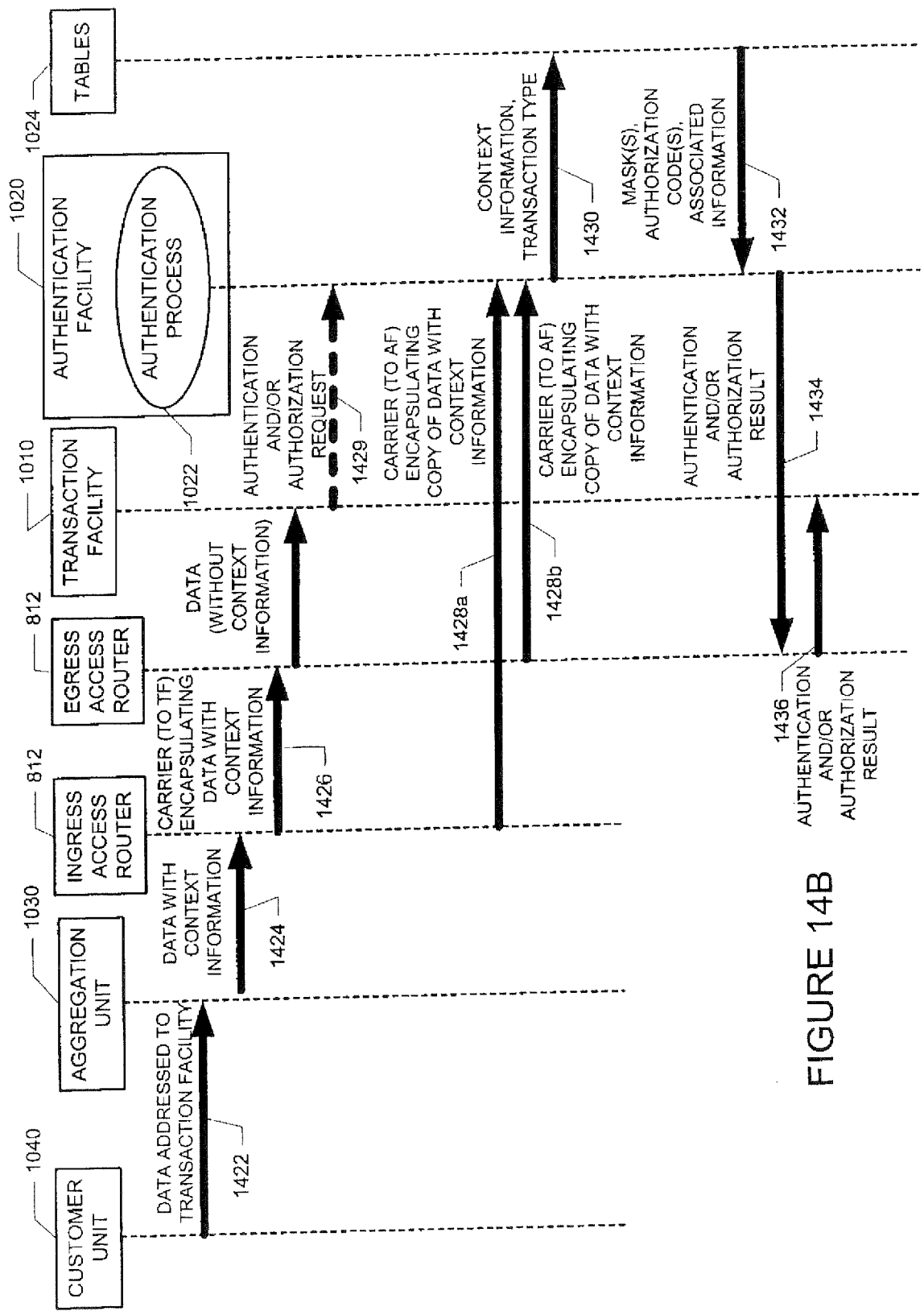
Figure 14C:
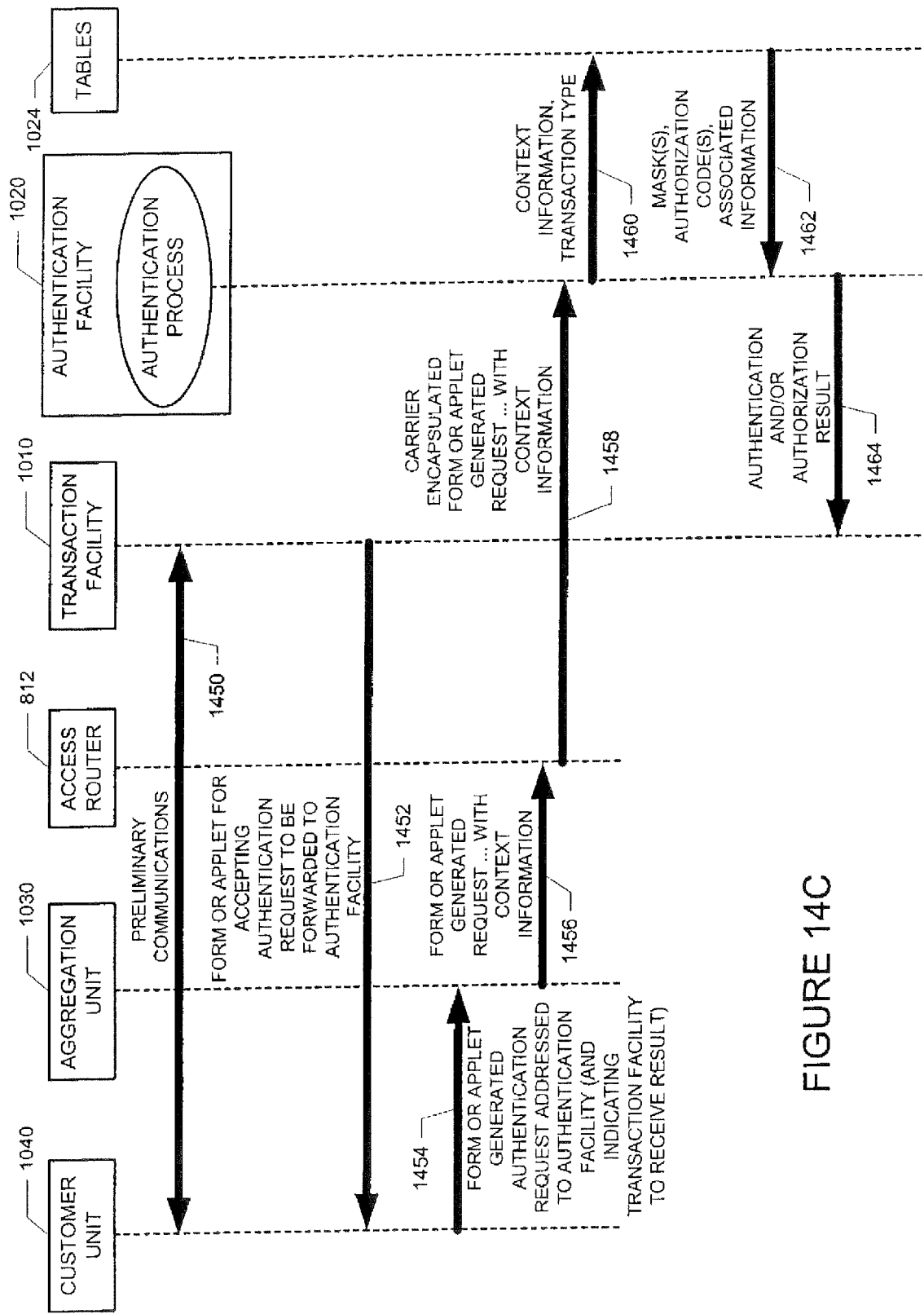

§4.4.2 Examples of Operation: Authentication Facility Located Within Transport Network but Transaction Facility Located Outside Transport Network FIGS. 14B and 14C are messaging diagrams which illustrate examples of how the present invention may operate in the context of an environment, such as that described above with reference to FIG. 10B, in the which the authentication facility is located within the transport network, but the transaction facility is located outside the transport network. Basically, the example illustrated in FIG. 14B uses forms or applets provided by the transaction facility, to ensure that context information associated with the customer unit 1010 reaches the authentication facility 1020. On the other hand, the example illustrated in FIG. 14C uses intelligence at the ingress or egress (preferably egress) access router to forward copies of communications including context information to the authentication facility 1020. Each is described below.

Referring first to FIG. 14B, as indicated by communication 1422, a customer unit 1040 sends message including data addressed (e.g., with a layer 3 address) to a transaction facility, to an aggregation unit 1030. As indicated by communication 1424, the aggregation unit 1030 forwards the data, with context information, to an ingress access router 812. Then, as indicated by communication 1426, the ingress access router encapsulates the data and context information within a carrier which is used by the transport network to forward the data and context information to an egress access router 812 associated with the addressed transaction facility 1010. At the egress access router and/or the aggregation unit (not shown), the context information can be overwritten, and the data forwarded to the transaction facility 1010 outside the transport network.

As indicated by communications 1428*a* and 1428*b*, the ingress access router 812 and/or the egress access router 812, respectively, can generate a copy of the data, including the context information, and forward it to the in-network authentication facility 1020. Note the context information and data is encapsulated with carrier information so that the context information is preserved. The access router 812 responsible for forwarding a copy to the authentication facility 1020 may do so based on various conditions such as (a) if the packet has a layer 3 address matching a transaction facility, (b) if the payload indicates that it is transaction related, (c) if higher layer information indicates a transaction related application, etc.

As indicated by communication 1429, the transaction facility can send a separate authentication request, which will not include the context information, to the authentication facility 1020, via the access router 812. As indicated by communications 1430 and 1432, the authentication process 1022 can get the information it needs to make an authentication determination. (Recall, e.g., FIG. 18.) It can then provide its authentication (and/or authorization) result to the requesting transaction facility 1010 via the egress access router 812 as indicated by communications 1434 and 1436.

Referring now to FIG. 14C, for example, after some preliminary communications 1450, the transaction facility may send a form or applet, used for accepting, among other things, an authentication request for forwarding to the authentication facility, to a customer unit 1040 as indicated by communication 1452. As shown by communication 1454, the completed form or applet (which may identify the transaction facility to receive the result), addressed to the authentication facility 1020, is advanced to the aggregation device 1030. As indicated by communication 1456, the aggregation unit 1030 forwards the form or applet generated request, with context information, to an ingress access router 812. Then, as indicated by communication 1458, the ingress access router 812 encapsulates the form or applet generated authentication request and context information within a carrier which is used by the transport network to forward the form or applet generated authentication request and context information, to the authentication facility 1020. As indicated by communications 1460 and 1462, the authentication process 1022 can get the information it needs to make an authentication determination. It can then provide its authentication (and/or authorization) result to the transaction facility 1010 (e.g., as identified in the request) via an egress access router 812 (not shown) as indicated by communications 1464.

Figure 14D:
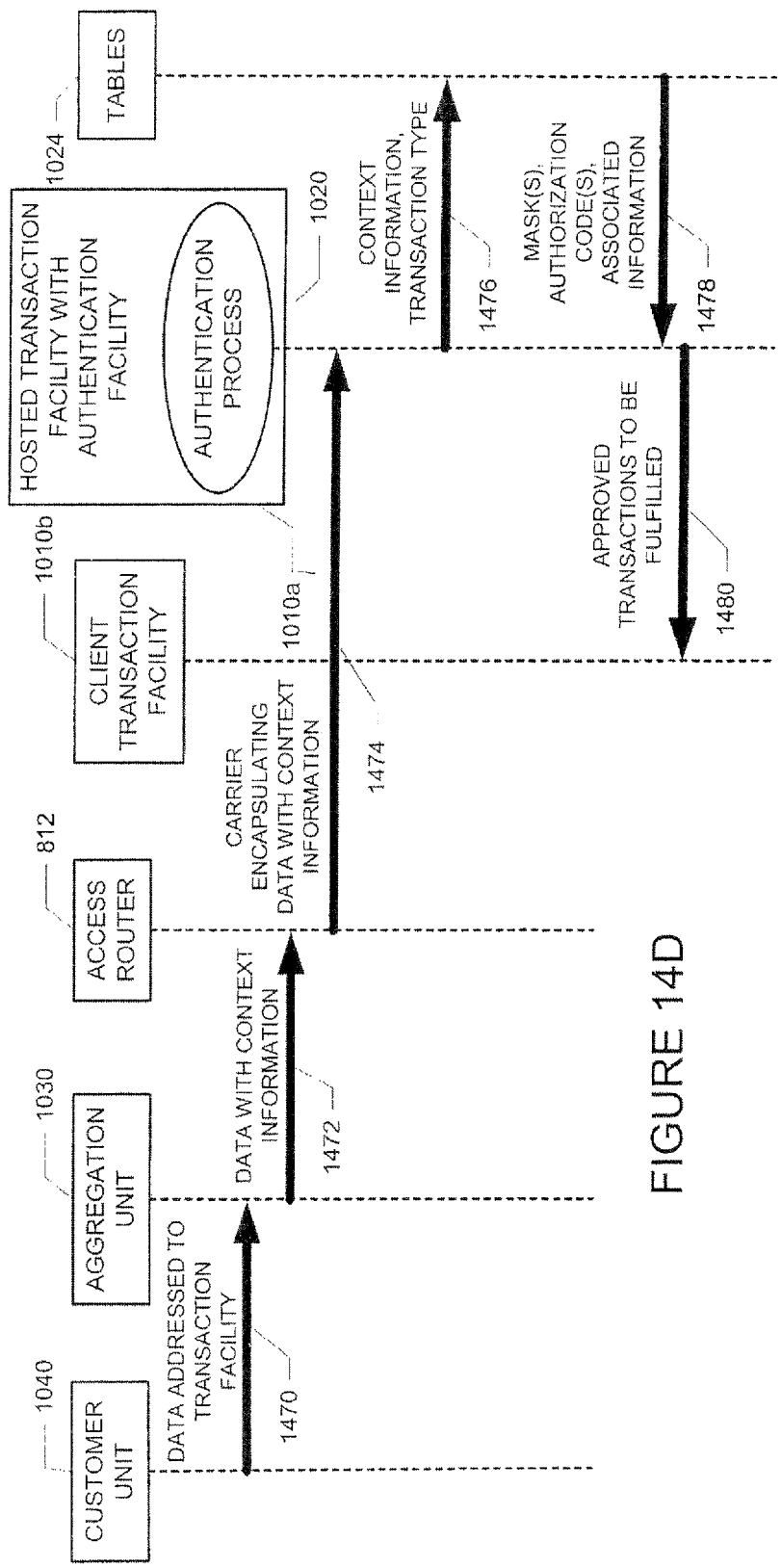

§4.4.3 Examples of Operation: Authentication Facility and Hosted Transaction Facility Located WITHIN Transport Network FIG. 14D is a messaging diagram that illustrates an example of how the present invention may operate in the context of an environment, such as that described above with reference to FIG. 10C, in which both the hosted transaction facility and the authentication facility are located within the transport network. As indicated by communication 1470, a customer unit 1040 sends message including data addressed (e.g., with a layer 3 address) to a host transaction facility 1010*a*, to an aggregation unit 1030. As indicated by communication 1472, the aggregation unit 1030 forwards the data, with context information, to an ingress access router 812. Then, as indicated by communication 1474, the ingress access router 812 encapsulates the data with context information within a carrier which is used by the transport network to forward the data and context information to the in-network hosted transaction facility 1010*a*. As indicated by communications 1476 and 1478, the authentication process 1022 can get the information it needs to make an authentication determination. (Recall, e.g., FIG. 18.) It can then provide one or more approved transactions to be fulfilled to a client transaction facility 1010*b*, as indicated by communications 1480. The client transaction facility 1010*b* can be located anywhere, and the approved transactions to be fulfilled can be communicated in any one of a number of ways.

In each of the foregoing exemplary methods and environments, note that authorization determinations may also be made. Recall that more or less of the context information can be used if greater or lesser degrees of certainty, respectively, regarding authentication are desired.

§4.5 Conclusions

As can be appreciated from the foregoing, the present invention may leverage at least a part of context information inserted into packets by an aggregation unit 1030 in an exemplary IP network for use in authorizing transactions. Since this context information may be provisioned and controlled by the network service provider, fraud is deterred or eliminated. Since the context information may include customer identifiers and a logical ingress port, transactions can be made with more confidence. Even fraudulent transactions may be tracked based on at least a part of such context information. Notice that authentication of network users or customers can be accomplished without any client signaling software.

What is claimed is:

1. A method, comprising:
    receiving a packet having at least a part of layer 2 header information replaced with a unique bit string of context information;
    examining at least a part of the unique bit string;
    comparing the at least a part of the unique bit string examined with stored context information; and
    authenticating a party to a transaction only if the at least a part of the unique bit string examined matches the stored context information.

2. The method of claim 1, wherein the at least a part of the unique bit string examined depends on a type of a transaction.

3. The method of claim 1, wherein the stored context information compared with the at least a part of the unique bit string examined depends on a type of the transaction.

4. The method of claim 1, wherein the at least a part of the unique bit string examined identifies at least one of a location at which packets from the party to a transaction entered the network, an individual who is a party to the transaction, a group to which an individual, who is a party to the transaction, belongs, and a customer that is a party to the transaction.

5. The method of claim 1, wherein the act of authenticating does not require the transmission of any authentication information from the party.

6. The method of claim 1, the context information including information to identify a customer, an ingress logical interface, and at least one of a service level and a service type.

7. A method, comprising:
- receiving a packet associated with a transaction, the packet having at least a part of layer 2 header information replaced with a unique bit string of context information;
- examining at least a part of the unique bit string; and
- determining a network ingress location from which the packet originated from the at least a part of the unique bit string.

8. The method of claim 7, wherein the at least a part of the unique bit string examined identifies at least one of a customer identification, an individual user identification, the network ingress location, and an individual user class.

9. The method of claim 7 wherein the unique bit string is provisioned by a network service provider.

10. The method of claim 7 wherein the unique bit string is controlled by a network service provider.

11. The method of claim 7, wherein the at least a part of the unique bit string examined depends on a type of transaction.

12. The method of claim 7, the context information including information to identify a customer, an ingress logical interface, and at least one of a service level and a service type.

13. A device, comprising a processor and a memory, the memory storing instructions for:
- receiving a packet having at least a part of layer 2 header information replaced with a unique bit string of context information;
- examining at least a part of the unique bit string;
- comparing the at least a part of the unique bit string examined with stored context information; and
- authenticating a party to a transaction only if the at least a part of the unique bit string examined matches the stored context information.

14. The device of claim 13, wherein the at least a part of the unique bit string examined depends on a type of a transaction.

15. The device of claim 13, wherein the stored context information compared with the at least a part of the unique bit string examined depends on a type of the transaction.

16. The device of claim 13, wherein the at least a part of the unique bit string examined identifies at least one of a location at which packets from the party to a transaction entered the network, an individual who is a party to the transaction, a group to which an individual, who is a party to the transaction, belongs, and a customer that is a party to the transaction.

17. The device of claim 13, wherein the act of authenticating does not require the transmission of any authentication information from the party.

18. The device of claim 13, wherein the context information is configured to include information to identify a customer, an ingress logical interface, and at least one of a service level and a service type.

19. A device, comprising a processor and a memory, the memory storing instructions that when executed cause the processor to:
- receive a packet associated with a transaction, the packet having at least a part of layer 2 header information replaced with a unique bit string of context information;
- examine at least a part of the unique bit string; and
- determine a network ingress location from which the packet originated from the at least a part of the unique bit string.

20. The device of claim 19, wherein the at least a part of the unique bit string examined identifies at least one of a customer identification, an individual user identification, the network ingress location, and an individual user class.

21. The device of claim 19, wherein the unique bit string is provisioned by a network service provider.

22. The device of claim 19, wherein the unique bit string is controlled by a network service provider.

23. The device of claim 19, wherein the at least a part of the unique bit string examined depends on a type of transaction.

24. The device of claim 19, wherein the context information is configured to include information to identify a customer, an ingress logical interface, and at least one of a service level and a service type.

25. A method, comprising:
- receiving a packet associated with a transaction, the packet having at least a part of layer 2 header information replaced with a unique bit string of context information;
- examining at least a part of the unique bit string;
- comparing the at least a part of the unique bit string examined with stored context information;
- determining a network ingress location from which the packet originated from the at least a part of the unique bit string; and
- authenticating the party only if the at least a part of the unique bit string examined matches the stored context information.

* * * * *